US012700800B2

(12) United States Patent

Hunter et al.

(10) Patent No.: US 12,700,800 B2

(45) Date of Patent: Aug. 4, 2026

(54) MULTI-FUNCTION HIGH SIDE FIELD-EFFECT TRANSISTOR DRIVER CIRCUIT

(71) Applicant: TEXAS INSTRUMENTS INCORPORATED, Dallas, TX (US)

(72) Inventors: Bradford Hunter, Austin, TX (US); Jing Ye, Dallas, TX (US); Xiaoqiu Summer Huang, Dallas, TX (US); Terry Sculley, Lewisville, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/498,163

(22) Filed: Oct. 31, 2023

(65) Prior Publication Data

US 2025/0141352 A1 May 1, 2025

(51) Int. Cl.
| | |
|---|---|
| *H02M 3/07* | (2006.01) |
| *H02M 1/00* | (2006.01) |
| *H02M 1/088* | (2006.01) |
| *H02M 1/32* | (2007.01) |

(52) U.S. Cl.
CPC ........... *H02M 3/07* (2013.01); *H02M 1/0006* (2021.05); *H02M 1/088* (2013.01); *H02M 1/32* (2013.01)

(58) Field of Classification Search
CPC ...... H02M 3/07; H02M 1/0006; H02M 1/088; H02M 1/32; H03K 17/00
See application file for complete search history.

(56) References Cited

U.S. PATENT DOCUMENTS

| | | | | |
|---|---|---|---|---|
| 12,113,438 B2 * | 10/2024 | Low | ...................... | H02M 3/073 |
| 2008/0150621 A1 * | 6/2008 | Lesso | ...................... | H02M 3/07 |
| | | | | 327/536 |
| 2011/0204959 A1 * | 8/2011 | Sousa | ...................... | H02M 3/07 |
| | | | | 327/536 |
| 2013/0234513 A1 * | 9/2013 | Bayer | ...................... | H02M 3/07 |
| | | | | 307/31 |

OTHER PUBLICATIONS

Texas Instruments, BQ76952 3-Series to 16-Series High Accuracy Battery Monitor and Protector for Li-Ion, Li-Polymer, and LiFePO4 Battery Packs. Published Jan. 2020—Revised Nov. 2021.

* cited by examiner

*Primary Examiner* — Sibin Chen

(74) *Attorney, Agent, or Firm* — Charles F. Koch

(57) ABSTRACT

An integrated circuit comprises a charge pump connected to a power source terminal and to a ground terminal, the charge pump having a charge pump output terminal; and a switch matrix having a plurality of switch matrix inputs and a plurality of switch matrix outputs, wherein pairs of the plurality of switch matrix outputs are connected to respective ones of a respective plurality of output terminals, and wherein the charge pump output terminal is connected to a first subset comprising at least three of the plurality of switch matrix inputs.

20 Claims, 13 Drawing Sheets

1200

1201 — SENSE, BY A SEMICONDUCTOR SWITCH, A SEMICONDUCTOR SWITCH OUTPUT TERMINAL VOLTAGE (CHG) AT A SEMICONDUCTOR SWITCH OUTPUT TERMINAL, IN RELATION TO A POWER SOURCE VOLTAGE (CELL+) OF A POWER SOURCE

1202 — IS CHG GREATER THAN CELL+?

NO

YES

1203 — CONFIGURE THE SEMICONDUCTOR SWITCH TO CAUSE CONDUCTION

1204 — CONFIGURE THE SEMICONDUCTOR SWITCH TO INHIBIT CONDUCTION

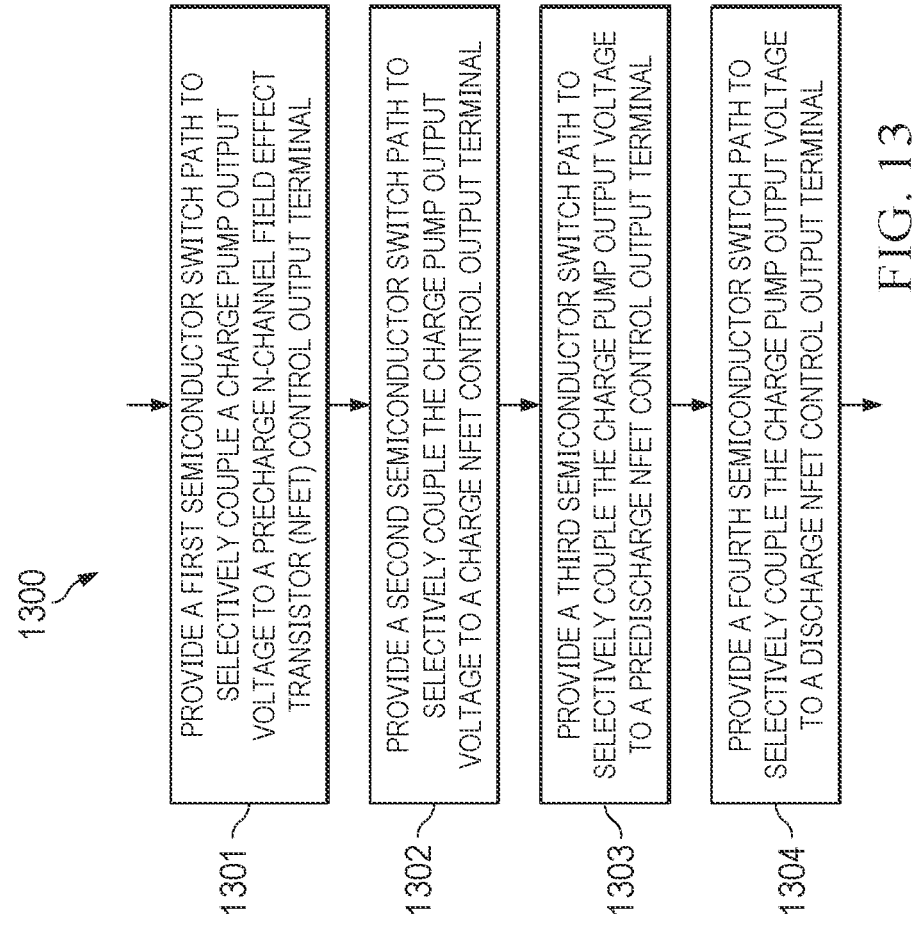

1300

1301 — PROVIDE A FIRST SEMICONDUCTOR SWITCH PATH TO SELECTIVELY COUPLE A CHARGE PUMP OUTPUT VOLTAGE TO A PRECHARGE N-CHANNEL FIELD EFFECT TRANSISTOR (NFET) CONTROL OUTPUT TERMINAL

1302 — PROVIDE A SECOND SEMICONDUCTOR SWITCH PATH TO SELECTIVELY COUPLE THE CHARGE PUMP OUTPUT VOLTAGE TO A CHARGE NFET CONTROL OUTPUT TERMINAL

1303 — PROVIDE A THIRD SEMICONDUCTOR SWITCH PATH TO SELECTIVELY COUPLE THE CHARGE PUMP OUTPUT VOLTAGE TO A PREDISCHARGE NFET CONTROL OUTPUT TERMINAL

1304 — PROVIDE A FOURTH SEMICONDUCTOR SWITCH PATH TO SELECTIVELY COUPLE THE CHARGE PUMP OUTPUT VOLTAGE TO A DISCHARGE NFET CONTROL OUTPUT TERMINAL

FIG. 13

MULTI-FUNCTION HIGH SIDE FIELD-EFFECT TRANSISTOR DRIVER CIRCUIT

BACKGROUND

Energy management systems can be used to perform various functions in electronic circuits involving movement of electric charge from one or more elements to one or more other elements. As an example, an energy management system can control the movement of electric charge from a power supply, such as a charger, to a power source, such as an energy storage device, such as a battery, supercapacitor, or another device the state of which can be reversibly changed by the inflow and outflow of electric charge. For example, when used with a battery, an energy management system can be referred to as a battery management system. As another example, an energy management system can control the movement of electric charge from a power source to a load, such as from a battery to an electronic device, such as a computing device, for example, a telephone, tablet, laptop computer, or desktop computer.

SUMMARY

An integrated circuit comprises a charge pump connected to a power source terminal and to a ground terminal, the charge pump having a charge pump output terminal; and a switch matrix having a plurality of switch matrix inputs and a plurality of switch matrix outputs, wherein pairs of the plurality of switch matrix outputs are connected to respective ones of a respective plurality of output terminals, and wherein the charge pump output terminal is connected to a first subset comprising at least three of the plurality of switch matrix inputs.

BRIEF DESCRIPTION OF THE DRAWINGS

FIG. 13 is a flow diagram illustrating a method in accordance with some aspects of the present disclosure.

DETAILED DESCRIPTION

The drawings are not drawn to scale.

Energy management systems are utilized in a wide variety of electronic circuits given their ability to manage the transfer of energy among power supplies, power sources, and electrical loads. An energy management system may comprise integrated circuitry and one or more transistors to control the flow of electricity. During operation, semiconductor switches can be opened and closed, and the operation of the semiconductor switches is used to control transistors. As an example, the transistors can switch current paths to provide charging or discharging of a power source, such as a battery. As a further example, the transistors can switch additional current paths to provide other modes, such as pre-charging and pre-discharging, in addition to charging and discharging. Energy management systems may be configured in a variety of topologies that provide a variety of relationships of current paths to modes of operation. As examples, a common current path may be provided for more than one mode of operation or two or more separate current paths can be provided to serve different modes of operation. An energy management system may comprise a circuit in which semiconductor switches provide outputs that are configurable to support different topologies, such as different arrangements of transistors for routing current.

A simple driver circuit may be provided to allow a semiconductor switch to control a p-channel field-effect transistor (pFET), and a charge pump can be provided to yield a voltage sufficient to allow a semiconductor switch to control an n-channel field-effect transistor (nFET). As nFETs can be preferable in many instances, a charge pump can be used commonly among nFETs enabling different modes of operation, such as pre-charging and charging or pre-discharging or discharging. A single charge pump can be sufficient to provide control voltages, switchable by semiconductor switches, to nFETs implementing pre-charging, charging, pre-discharging, and discharging operations.

A semiconductor switch circuit can provide protection against faults, such as a short circuit. A fault-protective semiconductor switch circuit can be used where fault protection is beneficial, while a simpler semiconductor switch circuit can be used for semiconductor switches where such fault protection is not needed.

Figure 1:
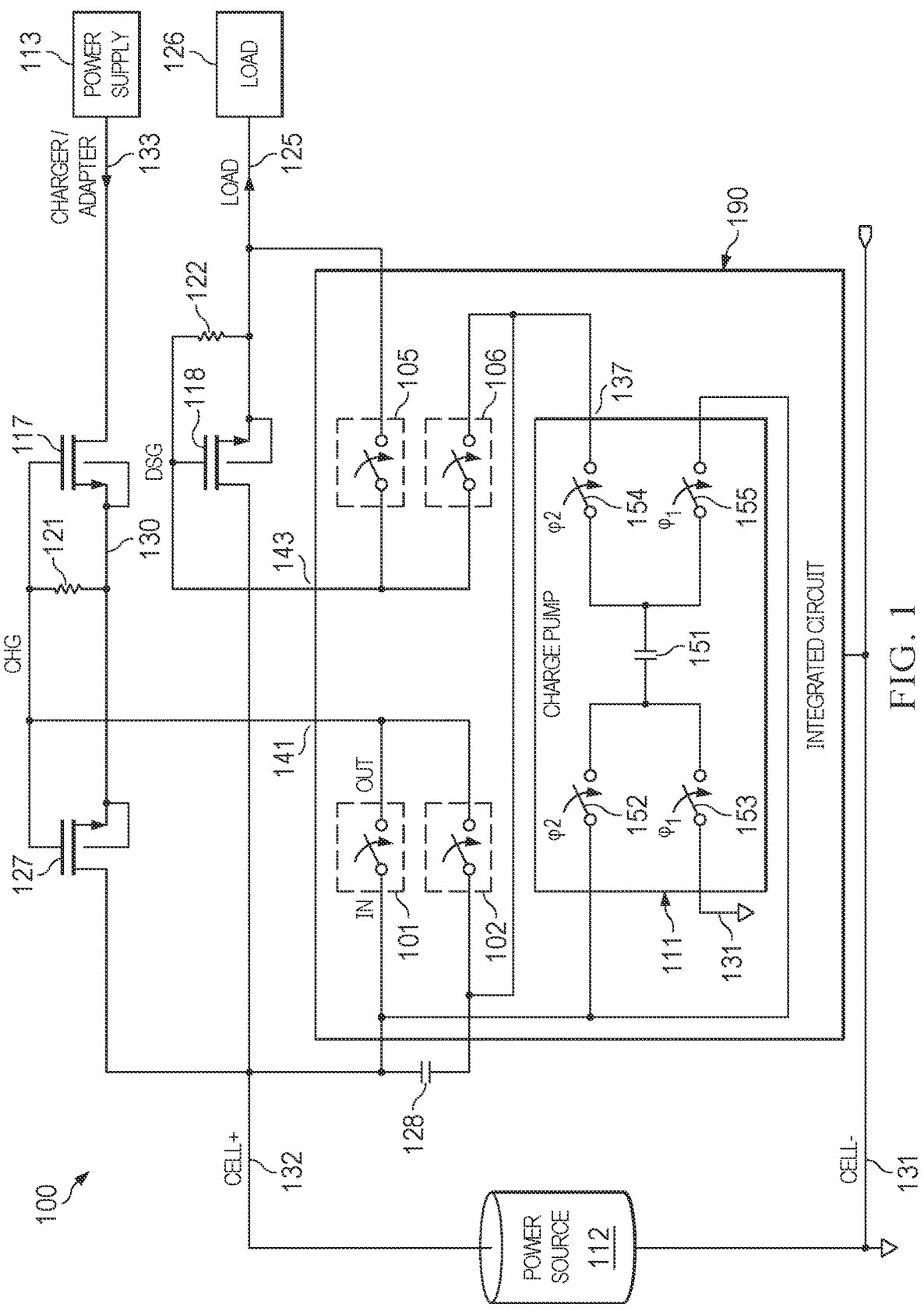
FIG. 1 is a schematic diagram illustrating an apparatus in accordance with some aspects of the present disclosure.

FIG. 1 is a schematic diagram illustrating an apparatus in accordance with some aspects of the present disclosure. The apparatus 100 comprises a circuit. The circuit may be used to implement an energy management system. The circuit comprises a switch matrix, charge pump 111, power source 112, power supply 113, load 126, charging circuit input transistor 117, charging circuit output transistor 127, current-limiting element 121, discharging circuit transistor 118, and current-limiting element 122. The switch matrix comprises semiconductor switch 101 semiconductor switch 102, semiconductor switch 105, semiconductor switch 106. Charge pump 111 comprises capacitor 151, semiconductor switch 152, semiconductor switch 153, semiconductor switch 154, and semiconductor switch 155. As an example, charge pump 111 semiconductor switch 101, semiconductor switch 102, semiconductor switch 105, and semiconductor switch 106 can be incorporated into integrated circuit 190. As an example, charging circuit input transistor 117, charging circuit output transistor 127, and discharging circuit transistor 118 can be n-channel field-effect transistors (nFETs).

While charge pump 111 is depicted as comprising capacitor 151, semiconductor switch 152, semiconductor switch 153, semiconductor switch 154, and semiconductor switch 155, the illustrated circuit of charge pump 111 is one of various possible charge pump circuit implementations. A charge pump is a circuit that generates a voltage that is higher than the input power source or supply. This allows the integrated circuit to have access to a voltage source that can drive an n-channel metal-oxide-semiconductor field-effect transistor (nMOSFET) gate to a voltage above the power source or supply. As an nMOSFET gate typically presents a high-impedance load, a charge pump can drive the nMOS-FET gate even if the charge pump has a high output resistance. In this way, the nMOSFET input and output terminals can be connected inline with the positive terminals of the power source and be controlled by applying the charge pump voltage source to the nMOSFET gate terminal, for example, using a semiconductor switch. An nMOSFET is an example of one type of nFET.

Power source 112 has a first power source terminal 131 and a second power source terminal 132. As an example, first power source terminal 131 can provide a ground voltage for apparatus 100. Thus, first power source terminal 131 can be referred to as a ground terminal. Second power source terminal 132 can be connected to integrated circuit 190. As an example, second power source terminal 132 can provide a supply voltage, such as a ground voltage, which can serve as a reference voltage with respect to one or more other supply voltages. Second power source terminal 132 can also be connected to other elements, such as power supply 113 or load 126. Second power source terminal 132 is connected to charge pump 111. A first charge pump semiconductor switch 152 has a first charge pump semiconductor switch input, which is connected to second power source terminal 132. A second charge pump semiconductor switch input of second charge pump semiconductor switch 153 is connected to first power source terminal 131. A first charge pump semiconductor switch output of first charge pump semiconductor switch 152 and a second charge pump semiconductor switch output of second charge pump semiconductor switch 153 are connected to a first capacitor terminal of capacitor 151. A third charge pump semiconductor switch input of third charge pump semiconductor switch 154 is connected to a second capacitor terminal of capacitor 151. A fourth charge pump semiconductor switch input of fourth charge pump semiconductor switch 155 is connected to second power source terminal 132. A third charge pump semiconductor switch output of third charge pump semiconductor switch 154 provides a charge pump output at a charge pump output voltage. As an example, the charge pump output voltage can be higher than the power source voltage of power source 112. A fourth charge pump semiconductor switch output of fourth charge pump semiconductor switch 155 is connected to the second capacitor terminal of capacitor 151. Optionally, a capacitor 128 can have a first terminal connected to second power source terminal 132 and a second terminal connected to charge pump (CP) output terminal 137. The capacitor can be referred to as a reservoir capacitor, the first terminal can be referred to as a first reservoir capacitor terminal, and the second terminal can be referred to as a second reservoir capacitor terminal.

Figure 2:
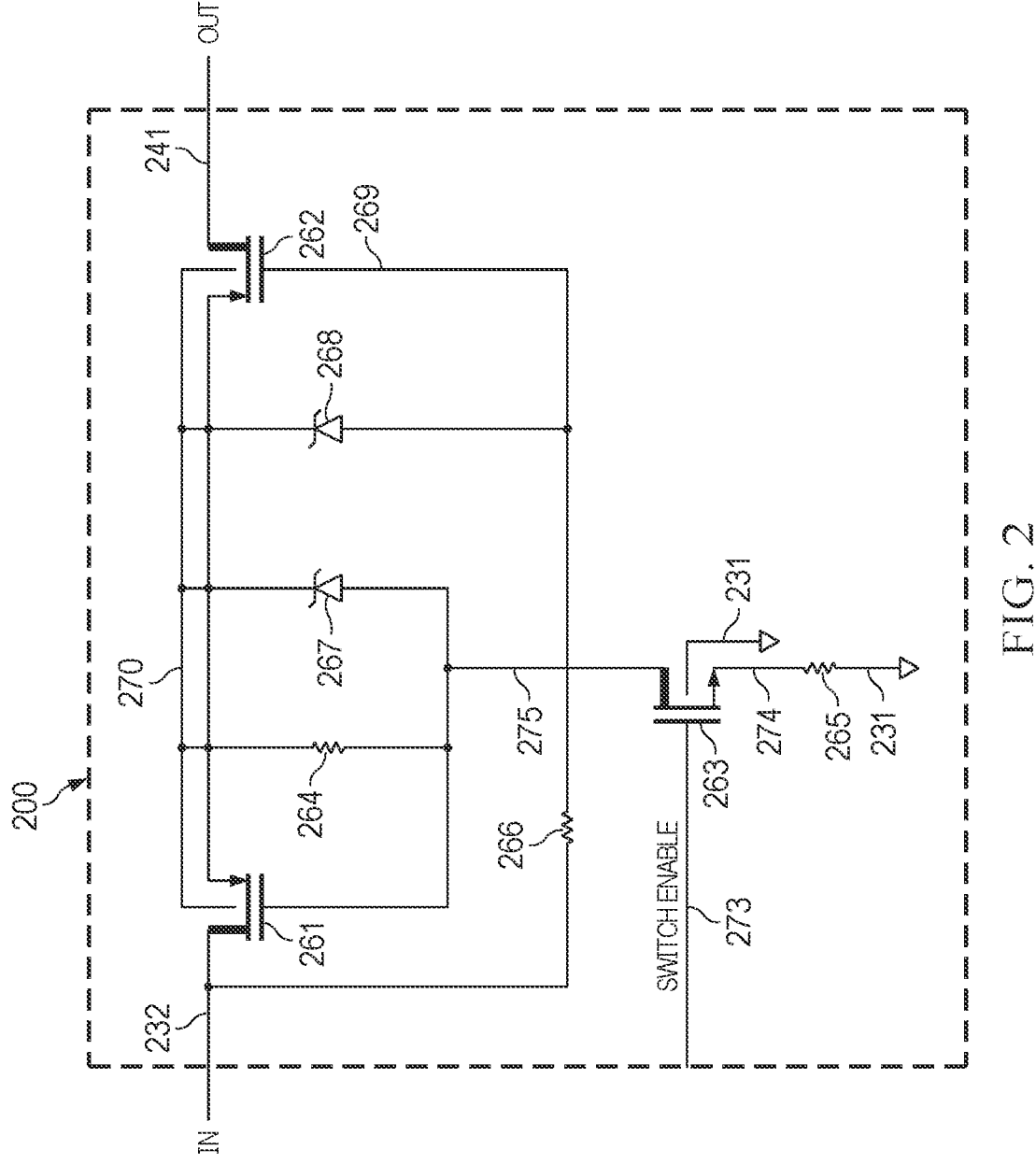
FIG. 2 is a schematic diagram illustrating a semiconductor switch in accordance with some aspects of the present disclosure.
Figure 7:
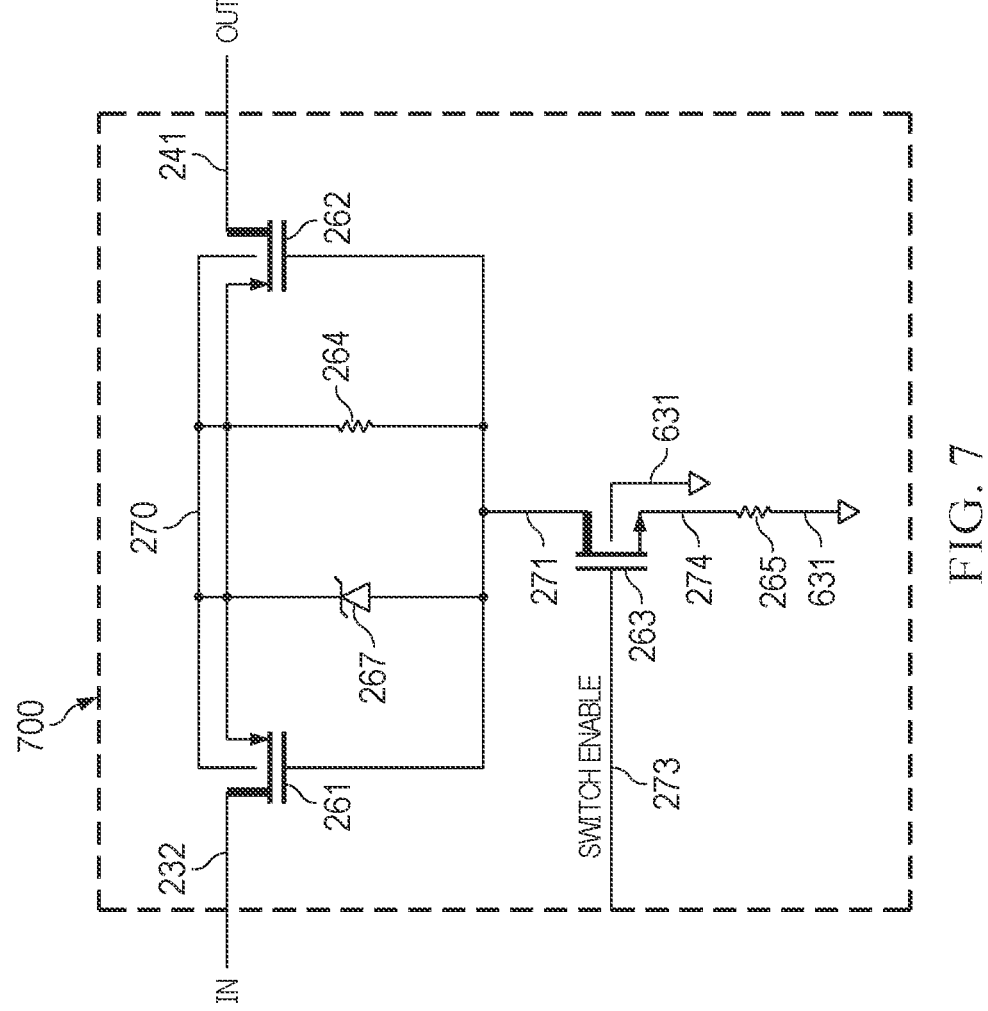
FIG. 7 is a schematic diagram illustrating a semiconductor switch in accordance with some aspects of the present disclosure.

First semiconductor switch 101 has a first semiconductor switch input connected to second power source terminal 132 and a first semiconductor switch output connected to first output terminal 141. Second semiconductor switch 102 has a second semiconductor switch input connected to charge pump output terminal 137 and a second semiconductor switch input connected to first output terminal 141. In the context of FIGS. 1-5, a third semiconductor switch 105 has a third semiconductor switch input connected to load terminal 125 and a third semiconductor switch output connected to second output terminal 143. In the context of FIGS. 1-5, a fourth semiconductor switch 106 has a fourth semiconductor switch input connected to charge pump output terminal 137 and a fourth semiconductor switch output connected to second output terminal 143. As an example, first semiconductor switch 101 can be implemented as shown in FIG. 2, and second semiconductor switch 102, third semiconductor switch 105, and fourth semiconductor switch 106 can be implemented as shown in FIG. 7.

A circuit for switching a charging current flow can be connected to first output terminal 141. A charging current can be provided by power supply 113, which can be connected to power supply terminal 133. Power supply terminal 133 is connected to a drain terminal of a charging circuit input transistor 117. First output terminal 141 is connected to a gate terminal of charging circuit input transistor 117, to a gate terminal of charging circuit output transistor 127, and to a first terminal of current-limiting element 121. A source terminal of charging circuit input transistor 117 is connected to a source terminal of charging circuit output transistor 127 and to a second terminal of current-limiting element 121 at node 130. A drain terminal of charging circuit output transistor 127 is connected to second power source terminal 132. A charging current from power supply 113 is provided to second power source terminal 132 when semiconductor switches 101 and 102 operate to control the switching of the charging current by charging circuit input transistor 117 and charging circuit output transistor 127.

A circuit for switching a discharging current flow can be connected to load terminal 125. A discharging current can be provided to load 126, which can be connected to load terminal 125. Second power source terminal 132 is connected to a drain terminal of discharging circuit transistor 118. Second output terminal 143 is connected to a gate terminal of discharging circuit transistor 118 and to a first terminal of current-limiting element 122. A source terminal of discharging circuit transistor 118 is connected to a second terminal of current-limiting element 122 and to load terminal 125. Load terminal 125 provides a discharging current to load 126 when semiconductor switches 105 and 106 operate to control the switching of the discharging current by discharging circuit transistor 118.

FIG. 2 is a schematic diagram illustrating a semiconductor switch in accordance with some aspects of the present disclosure. Semiconductor switch 200 comprises semiconductor switch input transistor 261, semiconductor switch output transistor 262, current-limiting element 264, voltage clamp circuit 267, current-limiting element 266, voltage clamp circuit 268, control transistor 263, and current-limiting element 265. As an example, semiconductor switch input transistor 261 and semiconductor switch output transistor 262 can be p-channel field-effect transistors (pFETs). As an example, control transistor 263 can be an n-channel field-effect transistor (nFET). An example, semiconductor switch input transistor 261, semiconductor switch output transistor 262, and control transistor 263 can be drain-extended transistors. Drain-extended transistors can allow a maximum drain-to-gate voltage and a maximum drain-to-source voltage to be far in excess of the gate-to-source voltage. On a schematic diagram symbol for a field-effect transistor (FET), a bold line on the drain terminal can denote an extended drain region, as shown in FIG. 2. An example of a drain-extended transistor is a drain-extended metal-oxide-semiconductor (DEMOS) transistor. A semiconductor switch input terminal 232 is connected to a drain terminal of semiconductor switch input transistor 261 and to a first terminal of current-limiting element 266. As an example, in reference to FIG. 1, semiconductor switch input terminal 232 can be connected to second power source terminal 132, as shown with respect to semiconductor switch 101 of FIG. 1. A drain terminal of semiconductor switch output transistor 262 is connected to semiconductor switch output terminal 241. As an example, in reference to FIG. 1, semiconductor switch output terminal 241 can be connected to first output terminal 141, as shown with respect to semiconductor switch 101 of FIG. 1. A source terminal of semiconductor switch input transistor 261 is connected to a body terminal of semiconductor switch input transistor 261, to a source terminal of semiconductor switch output transistor 262, to a body terminal of semiconductor switch output transistor 262, to a first terminal of current-limiting element 264, to a first terminal of voltage clamp circuit 267, and to a first terminal of voltage clamp circuit 268 at node 270. A drain terminal of control transistor 263 is connected to a gate terminal of semiconductor switch input transistor 261, to a second terminal of current-limiting element 264, and to a second terminal of voltage clamp circuit 267 at node 275. A second terminal of current-limiting element 266 is connected to a gate terminal of semiconductor switch output transistor 262 and to a second terminal of voltage clamp circuit 268 at node 269. Control terminal 273 is connected to a gate terminal of control transistor 263. A body terminal of control transistor 263 is connected to a ground terminal, such as first power source terminal 231. As an example, in reference to FIG. 1, the body terminal can be connected to first power source terminal 131. A source terminal of control transistor 263 is connected to a first terminal of current-limiting element 265 at node 274. As second terminal of current-limiting element 265 is connected to a ground terminal, such as first power source terminal 231. As an example, in reference to FIG. 1, the second terminal of current-limiting element 265 can be connected to first power source terminal 131.

Current-limiting circuits can compromise current-limiting elements. Current-limiting elements 264, 266, and 265 may be implemented with a device having a linear relationship of voltage and current, such as a resistor. Voltage clamp circuits 267 and 268 may be implemented with a device having a nonlinear relationship of voltage and current, such as a semiconductor junction. For example, a Zener diode or an avalanche diode may be used to implement a voltage clamp circuit. In such case, the first terminal of voltage clamp circuits 267 and 268 may be the cathode terminal, and the second terminal may be the anode terminal. As another example, a symmetric nonlinear device, such as a varistor or bilateral transient voltage suppressor, may be used to implement voltage clamp circuits 267 and 268.

Figure 3:
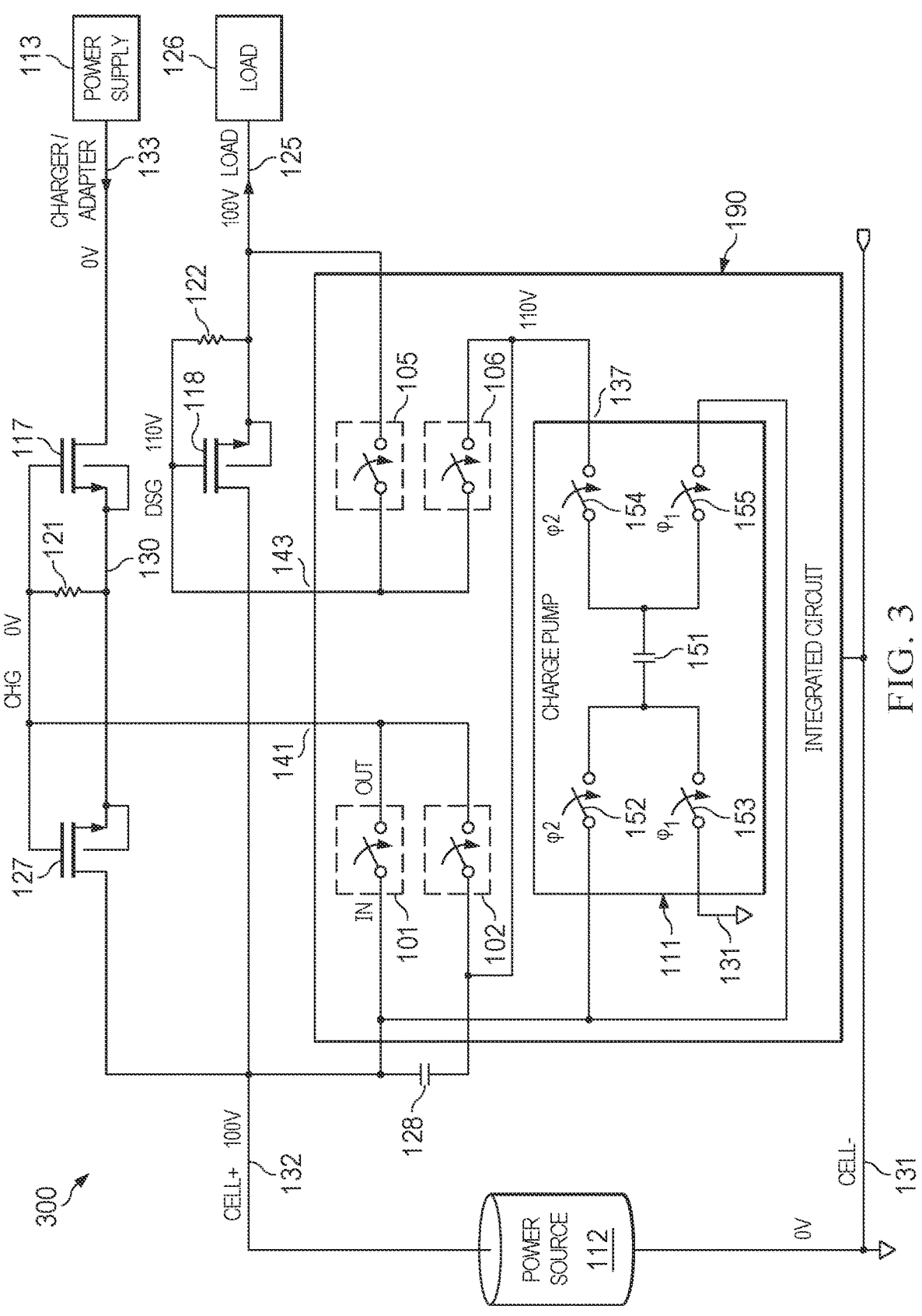
FIG. 3 is a schematic diagram illustrating the apparatus as shown in FIG. 1 with exemplary voltage notations in accordance with some aspects of the present disclosure.

FIG. 3 is a schematic diagram illustrating apparatus 300 identical to the apparatus 100 as shown in FIG. 1 with exemplary voltage notations in accordance with some aspects of the present disclosure. If power source 112 were to have a power supply voltage of, say, 100 volts, then, with reference to zero volts at first power source terminal 131, second power source terminal 132 would have a voltage of 100 volts. Discharging circuit transistor 118 could be activated to provide 100 volts at load terminal 125. As an example, a higher voltage, such as 110 volts, could be provided by charge pump 111 at charge pump output terminal 137. Semiconductor switch 106 could apply the 110 volts from charge pump output terminal 137 to second output terminal 143, providing sufficient voltage to the gate of discharging circuit transistor 118 to activate the transistor.

However, if a fault were to occur at power supply 113 or at power supply terminal 133 providing a conduction path (e.g., a short circuit) to ground (e.g., a connection of power supply terminal 133 to first power source terminal 131), a voltage of zero volts could be present at power supply terminal 133. A semiconductor switch as shown in FIG. 2 can operate to prevent charging circuit input transistor 117 and charging circuit output transistor 127 from providing conduction between second power source terminal 132, for example, at 100 volts, and power supply terminal 133, for example, at zero volts. For example, implementing a semiconductor switch as shown in FIG. 2 as semiconductor switch 101 of FIG. 1 can result in zero volts at first output terminal 141 when a grounded fault condition occurs, preventing a conduction path via the charging circuit between second power source terminal 132 and power supply terminal 133 in its grounded condition, thereby protecting the charging circuit and other system components, such as power source 112 and any faulty component that may have caused the fault condition.

Figure 4:
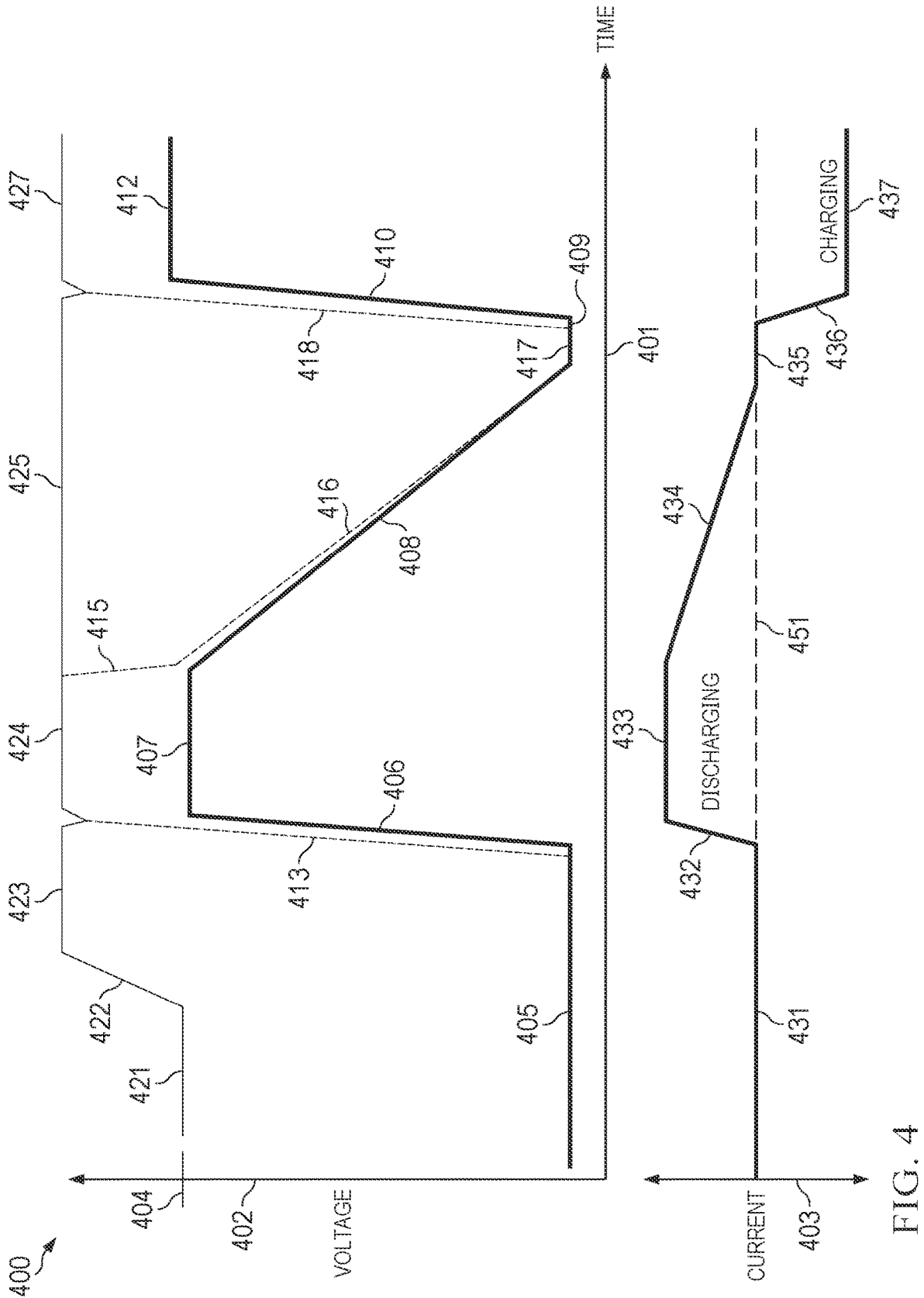
FIG. 4 is a timing diagram illustrating signals in accordance with some aspects of the present disclosure.

FIG. 4 is a timing diagram illustrating signals in accordance with some aspects of the present disclosure. Timing diagram 400 shows voltage signals with respect to time axis 401 and voltage axis 402 and current flow with respect to time axis 401 and current axis 403. A power source voltage 404 (e.g., a battery voltage, Vbat) is shown at a level along voltage axis 402. Initially, charge pump 111 is off, and the charge pump (CP) output voltage at charge pump output terminal 137 is a voltage 421, such as power source voltage 404. When charge pump 111 is activated, the charge pump output voltage at charge pump output terminal 137 rises, as shown by rising voltage 422. The charge pump output voltage remains substantially at the desired higher voltage, as shown by voltage 423, voltage 424, voltage 425, and voltage 427. The charge pump output voltage may dip slightly, as shown between voltage 423 and voltage 424 and between voltage 425 and voltage 427, for example, when a semiconductor switch closes to drive the gate of charging circuit input transistor 117 and charging circuit output transistor 127.

The output voltage at first output terminal 141 is initially at a low voltage (e.g., zero volts) as shown by voltage 405. When semiconductor switch 101 of FIG. 1 is activated, the output voltage (e.g., CHG) at first output terminal 141 rises, as shown by rising voltage 413. The output voltage at first output terminal 141 remains high (e.g., at the charge pump output voltage), as shown by voltage 424. A charging voltage is initially at a low voltage (e.g., zero volts), as shown by voltage 405. When semiconductor switch 101 of FIG. 1 is activated, the charging voltage (e.g., Charger) rises, as shown by rising voltage 406, to the power source voltage 404 and remains at that voltage, as shown by voltage 407. When semiconductor switch 101 of FIG. 1 is deactivated, the output voltage at first output terminal 141 falls rapidly to the power source voltage 404, as shown by falling voltage 415. As an example, the duration of the transition of falling voltage 415 may be on the order of microseconds to tens of microseconds (e.g., in the range of 1 microsecond to 100 microseconds). As an example, the duration of the transition of falling voltage 415 may be in the range of 5 microseconds to 50 microseconds (e.g., approximately 10 microseconds). From the power source voltage 404, the first output terminal 141 gradually falls, as shown by voltage 416, to a low voltage (e.g., zero volts), as shown by voltage 417. As an example, the duration of the transition of voltage 416 may be on the order of milliseconds to tens of milliseconds (e.g., in the range of 1 millisecond to 100 milliseconds). As an example, the duration of the transition of voltage 416 may be in the range of 5 milliseconds to 50 milliseconds (e.g., approximately 10 milliseconds). When semiconductor switch 101 of FIG. 1 is deactivated, the charging voltage gradually falls, as shown by falling voltage 408, to a low voltage (e.g., zero volts), as shown by voltage 409. As an example, the duration of the transition of falling voltage 408 may be on the order of milliseconds to tens of milliseconds (e.g., in the range of 1 millisecond to 100 milliseconds). As an example, the duration of the transition of falling voltage 408 may be in the range of 5 milliseconds to 50 milliseconds (e.g., approximately 10 milliseconds). Then, when no conduction path from power supply terminal 133 to ground is present, when semiconductor switch 101 is activated, the voltage at first output terminal 141 rises, as shown by rising voltage 418, to voltage 427. The charging voltage rises from voltage 409, as shown by rising voltage 410, to voltage 412, which is at or slightly above power source voltage 404, providing charging of power source 112.

The respective segments of current flow can be seen in relation to current axis 403. Before semiconductor switch 101 is activated, current flow is at zero, as shown by current level 431. When semiconductor switch 101 is activated, current flow changes to discharging in a situation where a conduction path from power supply terminal 133 to ground exists, as shown by increasing discharging current 432 followed by steady discharging current 433. When semiconductor switch 101 is deactivated, the discharging current declines, as shown by declining current 434. When the gradual declines of voltages 408 and 416 reach their minimum levels at voltage 409 and voltage 417, respectively, the current level returns to its baseline level 451 (e.g., zero current), as shown by steady current 435. When semiconductor switch 101 is activated with no conduction path from power supply terminal 133 to ground, current flow changes to charging, as shown by increase charging current 436 followed by steady charging current 437.

Figure 5:
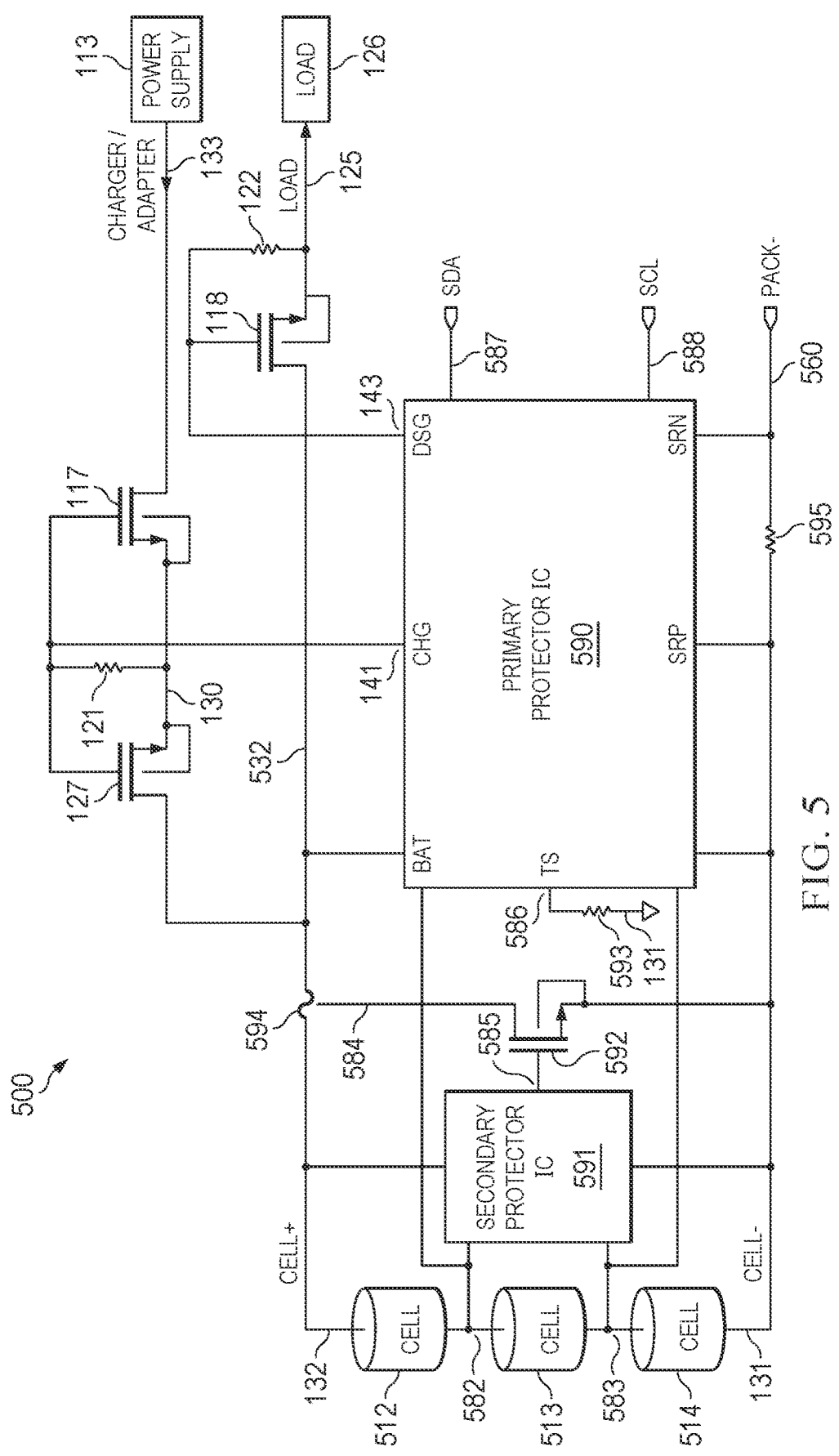
FIG. 5 is a schematic diagram illustrating an apparatus in accordance with some aspects of the present disclosure.

FIG. 5 is a schematic diagram illustrating an apparatus in accordance with some aspects of the present disclosure. Apparatus 500 implements an energy management system. Apparatus 500 comprises primary protector integrated circuit 590, secondary protector integrated circuit 591, a power source comprising cell 512, cell 513, and cell 514, a charging circuit comprising charging circuit input transistor 117, charging circuit output transistor 127, and current-limiting element 121, a discharging circuit comprising discharging circuit transistor 118 and current-limiting element 122, protective switch 594, protective switch control transistor 592, thermal sensor 593, ammeter shunt 595, power supply 113, and load 126. Power supply 113 provides a power supply output at power supply terminal 133, which is connected to a drain terminal of charging circuit input transistor 117. A first output terminal 141 of primary protector IC 590 is connected to a gate terminal of charging circuit input transistor 117, to a gate terminal of charging circuit output transistor 127, and to a first terminal of current-limiting element 121. A source terminal of charging circuit input transistor 117 is connected to a source terminal of charging circuit output transistor 127, to a second terminal of current-limiting element 121, to a body terminal of charging circuit input transistor 117, and to a body terminal of charging circuit output transistor 127 at node 130. A drain terminal of charging circuit output transistor 127 is connected to a power source terminal 532 of primary protector IC 590. Power source terminal 532 is connected to a drain terminal of discharging circuit transistor 118. Second output terminal 143 of primary protector IC 590 is connected to a gate terminal of discharging circuit transistor 118 and to a first terminal of current-limiting element 122. A source terminal of discharging circuit transistor 118 is connected to a second terminal of current-limiting element 122, to load terminal 125, and to a body terminal of discharging circuit transistor 118. Load terminal 125 is connected to electrical load 126.

First power source terminal 131 is connected to a terminal of cell 514. An opposite terminal of cell 514 is connected to node 583, which is connected to a terminal of cell 513, to primary protector IC 590, and to secondary protector IC 591. An opposite terminal of cell 513 is connected to node 582, which is connected to a terminal of cell 512, to primary protector IC 590, and to secondary protector IC 591. An opposite terminal of cell 512 is connected to second power source terminal 132. Second power source terminal 132 is connected to secondary protector IC 591 and to a first terminal of protective switch 594. A second terminal of protective switch 594 is connected to power source terminal 532 of primary protector IC 590.

Secondary protector IC 591 provides a protective switch control signal to a gate terminal of protective switch control transistor 592 at protective switch control output 585. A drain terminal of protective switch control transistor 592 is connected to a protective switch control input 584 of protective switch 594. A source terminal of protective switch control transistor 592 is connected to first power source terminal 131 and to a body terminal of protective switch control transistor 592. First power source terminal 131 is connected to secondary protector IC 591, to primary protector IC 590, and to a first terminal of ammeter shunt 595. A second terminal of ammeter shunt 595 is connected to power supply reference terminal 560. Power supply reference terminal 560 is connected to primary protector IC 590 and to power supply 113. Primary protector IC 590 is connected to a first terminal of thermal sensor 593 at thermal sensor input 586. A second terminal of thermal sensor 593 is connected to first power source terminal 131.

As an example, thermal sensor 593 can be a temperature sensor, such as a thermistor or a semiconductor temperature sensor. As an example, protective switch 594 can be a circuit interrupter, such as a fuse, a circuit breaker, a transistor, or another semiconductor device capable of reliably interrupting current flow. When not interrupting current flow, protective switch 594 provides conduction with low resistance, making power source terminal 532 functionally identical to second power source terminal 132 with regard to the description of second power source terminal 132 with respect to FIG. 1. Ammeter shunt 595 provides conduction with low resistance, making power supply reference terminal 560 functionally identical to first power source terminal 131 with regard to the description of first power source terminal 131 with respect to FIG. 1. A serial interface comprising serial data line 587 and serial clock line 588 is connected to primary protector IC 590.

Figure 6:
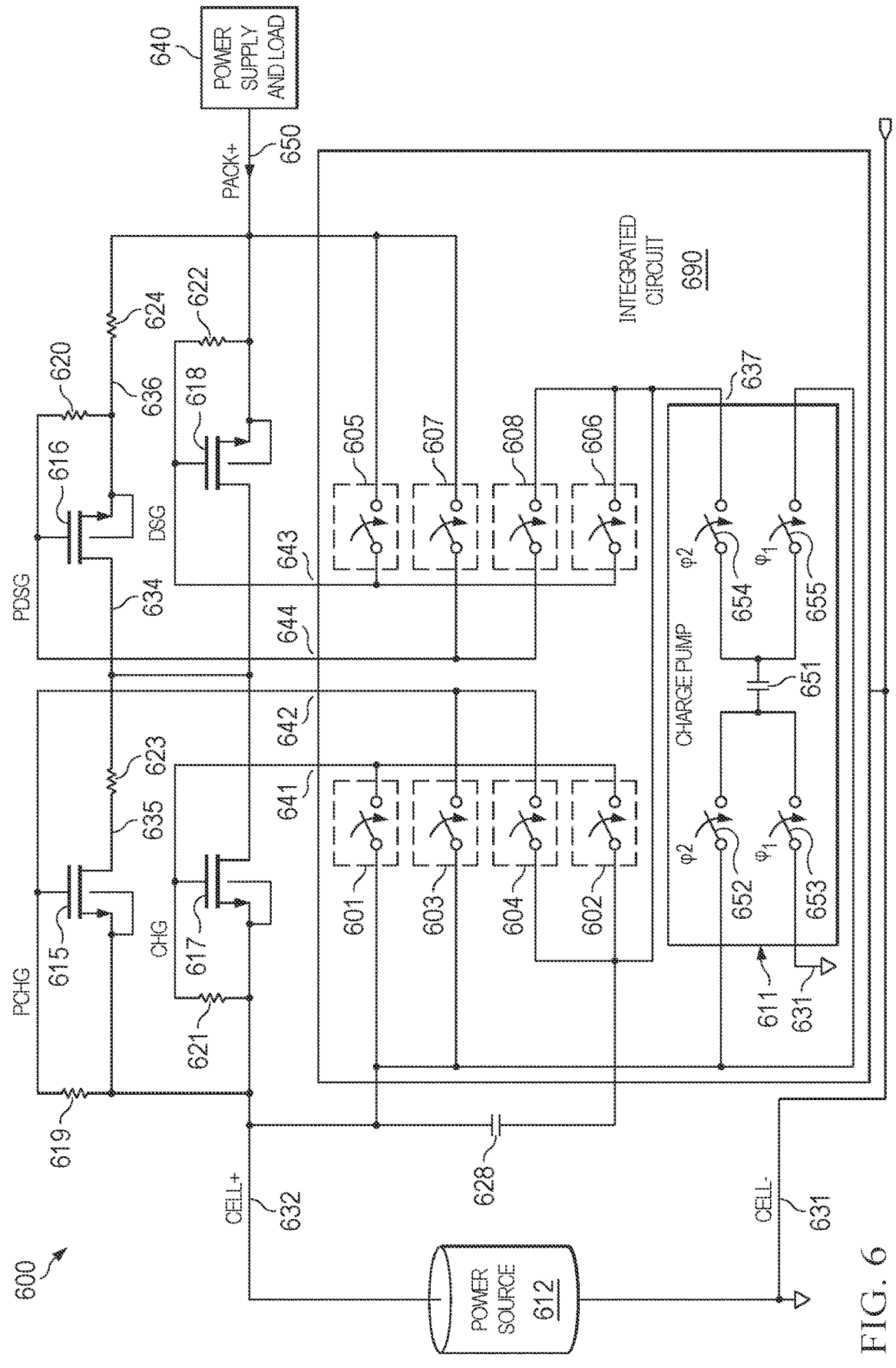
FIG. 6 is a schematic diagram illustrating an apparatus in accordance with some aspects of the present disclosure.

FIG. 6 is a schematic diagram illustrating an apparatus in accordance with some aspects of the present disclosure. Apparatus 600 comprises a circuit. The circuit may be used to implement an energy management system. The circuit comprises a switch matrix, charge pump 611, power source 612, power supply and load 640, charging circuit transistor 617, current-limiting element 621, discharging circuit transistor 618, current-limiting element 622, pre-charging circuit transistor 615, current-limiting element 619, current-limiting element 623, pre-discharging circuit transistor 616, current-limiting element 620, and current-limiting element 624. The switch matrix comprises semiconductor switch 601, semiconductor switch 602, semiconductor switch 603, semiconductor switch 604, semiconductor switch 605, semiconductor switch 606, semiconductor switch 607, semiconductor switch 608. As an example, charging circuit transistor 617, discharging circuit transistor 618, pre-charging circuit transistor 615, pre-discharging circuit transistor 616 can be n-channel field-effect transistors (nFETs). Charge pump 611 comprises capacitor 651, semiconductor switch 652, semiconductor switch 653, semiconductor switch 654, and semiconductor switch 655. As an example, charge pump 611, semiconductor switch 601, semiconductor switch 602, semiconductor switch 603, semiconductor switch 604, semiconductor switch 605, semiconductor switch 606, semiconductor switch 607, and semiconductor switch 608 can be incorporated into integrated circuit 690.

Power source 612 has a first power source terminal 631 and a second power source terminal 632. As an example, first power source terminal 631 can provide a ground voltage for apparatus 600. Thus, first power source terminal 631 can be referred to as a ground terminal. Second power source terminal 632 can be connected to integrated circuit 690. As an example, second power source terminal 632 can provide a supply voltage, such as a ground voltage, which can serve as a reference voltage with respect to one or more other supply voltages. Second power source terminal 632 can also be connected to other elements, such as power supply and load 640. Second power source terminal 632 is connected to charge pump 611. A first charge pump semiconductor switch 652 has a first charge pump semiconductor switch input, which is connected to second power source terminal 632. A second charge pump semiconductor switch input of second charge pump semiconductor switch 653 is connected to first power source terminal 631. A first charge pump semiconductor switch output of first charge pump semiconductor switch 652 and a second charge pump semiconductor switch output of second charge pump semiconductor switch 653 are connected to a first capacitor terminal of capacitor 651. A third charge pump semiconductor switch input of third charge pump semiconductor switch 654 is connected to a second capacitor terminal of capacitor 651. A fourth charge pump semiconductor switch input of fourth charge pump semiconductor switch 655 is connected to second power source terminal 632. A third charge pump semiconductor switch output of third charge pump semiconductor switch 654 provides a charge pump output at a charge pump output voltage. As an example, the charge pump output voltage can be higher than the power source voltage of power source 612. A fourth charge pump semiconductor switch output of fourth charge pump semiconductor switch 655 is connected to the second capacitor terminal of capacitor 651. Optionally, a capacitor 128 can have a first terminal connected to second power source terminal 632 and a second terminal connected to charge pump output terminal 637. The capacitor can be referred to as a reservoir capacitor, the first terminal can be referred to as a first reservoir capacitor terminal, and the second terminal can be referred to as a second reservoir capacitor terminal.

First semiconductor switch 601 has a first semiconductor switch input connected to second power source terminal 632 and a first semiconductor switch output connected to first output terminal 641. Second semiconductor switch 602 has a second semiconductor switch input connected to charge pump output terminal 637 and a second semiconductor switch input connected to first output terminal 641. Third semiconductor switch 603 has a third semiconductor switch input connected to second power source terminal 632 and a third semiconductor switch input connected to second output terminal 642. Fourth semiconductor switch 602 has a fourth semiconductor switch input connected to charge pump output terminal 637 and a fourth semiconductor switch input connected to second output terminal 642. In the context of FIGS. 6-9, a fifth semiconductor switch 605 has a fifth semiconductor switch input connected to power supply and load terminal 650 and a fifth semiconductor switch output connected to third output terminal 643. In the context of FIGS. 6-9, a sixth semiconductor switch 606 has a sixth semiconductor switch input connected to charge pump output terminal 637 and a sixth semiconductor switch output connected to third output terminal 643. A seventh semiconductor switch 607 has a seventh semiconductor switch input connected to power supply and load terminal 650 and a seventh semiconductor switch output connected to fourth output terminal 644. An eighth semiconductor switch 608 has an eighth semiconductor switch input connected to charge pump output terminal 637 and an eighth semiconductor switch output connected to fourth output terminal 644. As an example, first semiconductor switch 601, second semiconductor switch 602, third semiconductor switch 603, fourth semiconductor switch 604, fifth semiconductor switch 605, sixth semiconductor switch 606, seventh semiconductor switch 607, and eighth semiconductor switch 608 may be implemented as shown in FIG. 7.

A circuit for switching a pre-charging current flow can be connected to second output terminal 642. A pre-charging current can be provided by the power supply portion of power supply and load 640, which can be connected to power supply and load terminal 650. As an example, third output terminal 643 can provide a control signal to activate a discharging circuit comprising discharging circuit transistor 618 to provide a connection of power supply and load terminal 650 to central node 634. Central node 634 is connected to a first terminal of current-limiting element 623. A second terminal of current-limiting element 623 is connected to a drain terminal of pre-charging circuit transistor 615 at node 635. Second output terminal 642 is connected to a gate terminal of pre-charging circuit transistor 615 and to a first terminal of current-limiting element 619. A source terminal of pre-charging circuit transistor 615 is connected to a second terminal of current-limiting element 619 and to second power source terminal 632. A pre-charging current from power supply and load 640 is provided to second power source terminal 632 when semiconductor switches 603 and 604 operate to control the switching of the pre-charging current by pre-charging circuit transistor 615.

A circuit for switching a charging current flow can be connected to first output terminal 641. A charging current can be provided by the power supply portion of power supply and load 640, which can be connected to power supply and load terminal 650. As an example, third output terminal 643 can provide a control signal to activate a discharging circuit comprising discharging circuit transistor 618 to provide a connection of power supply and load terminal 650 to central node 634. Central node 634 is connected to a drain terminal of charging circuit transistor 617. First output terminal 641 is connected to a gate terminal of charging circuit transistor 617 and to a first terminal of current-limiting element 621. A source terminal of charging circuit transistor 617 is connected to a second terminal of current-limiting element 621 and to second power source terminal 632. A charging current from power supply and load terminal 650 is provided to second power source terminal 632 when semiconductor switches 601 and 602 operate to control the switching of the charging current by charging circuit transistor 617.

A circuit for switching a pre-discharging current flow can be connected to power supply and load terminal 650. A pre-discharging current can be provided to power supply and load 640, which can be connected to power supply and load terminal 650. Fourth output terminal 644 is connected to a gate terminal of pre-discharging circuit transistor 616 and to a first terminal of current-limiting element 620. Power supply and load terminal 650 is connected to a first terminal of current-limiting element 624. A second terminal of current-limiting element 624 is connected to a source terminal of pre-discharging circuit transistor 616 and to a second terminal of current-limiting element 620 at node 636. A drain terminal of pre-discharging circuit transistor 616 is connected to central node 634. Second power source terminal 632 can be connected to the drain terminal of pre-discharging circuit transistor 616 via a charging circuit comprising charging circuit transistor 617. Power source 612 provides a pre-discharging current to power supply and load 640 when semiconductor switches 607 and 608 operate to control the switching of the pre-discharging current by pre-discharging circuit transistor 616.

A circuit for switching a discharging current flow can be connected to power supply and load terminal 650. A discharging current can be provided to power supply and load 640, which can be connected to power supply and load terminal 650. Third output terminal 643 is connected to a gate terminal of discharging circuit transistor 618 and to a first terminal of current-limiting element 622. Power supply and load terminal 650 is connected to a source terminal of discharging circuit transistor 618 and to a second terminal of current-limiting element 622. A drain terminal of discharging circuit transistor 618 is connected to central node 634. Second power source terminal 632 can be connected to the drain terminal of discharging circuit transistor 618 via a charging circuit comprising charging circuit transistor 617. Power source 612 provides a discharging current to power supply and load terminal 650 when semiconductor switches 605 and 606 operate to control the switching of the discharging current by discharging circuit transistor 618.

While FIG. 6 is illustrated as comprising a pre-charging circuit, a charging circuit, a pre-discharging circuit, and a discharging circuit, it should be understood that a subset of such circuit can be implemented. As an example, an apparatus may provide semiconductor switches to drive output terminals for a pre-charging circuit, a charging circuit, and a discharging circuit, but not a pre-discharging circuit. As another example, an apparatus may provide semiconductor switches to drive output terminals for a charging circuit, a pre-discharging circuit, and a discharging circuit, but not a pre-charging circuit. Other subsets are also possible.

FIG. 7 is a schematic diagram illustrating a semiconductor switch in accordance with some aspects of the present disclosure. Semiconductor switch 700 comprises semiconductor switch input transistor 261, semiconductor switch output transistor 262, current-limiting element 264, voltage clamp circuit 267, control transistor 263, and current-limiting element 265. As an example, semiconductor switch input transistor 261 and semiconductor switch output transistor 262 can be p-channel field-effect transistors (pFETs). As an example, control transistor 263 can be an n-channel field-effect transistor (nFET). A semiconductor switch input terminal 232 is connected to a drain terminal of semiconductor switch input transistor 261. An example, semiconductor switch input transistor 261, semiconductor switch output transistor 262, and control transistor 263 can be drain-extended transistors. Drain-extended transistors can allow a maximum drain-to-gate voltage and a maximum drain-to-source voltage to be far in excess of the gate-to-source voltage. On a schematic diagram symbol for a field-effect transistor (FET), a bold line on the drain terminal can denote an extended drain region, as shown in FIG. 2. An example of a drain-extended transistor is a drain-extended metal-oxide-semiconductor (DEMOS) transistor. As an example, in reference to FIG. 6, semiconductor switch input terminal 232 of FIG. 7 can be connected to second power source terminal 632, as shown with respect to semiconductor switch 601 of FIG. 6. A drain terminal of semiconductor switch output transistor 262 is connected to semiconductor switch output terminal 241. As an example, in reference to FIG. 6, semiconductor switch output terminal 241 can be connected to first output terminal 641, as shown with respect to semiconductor switch 601 of FIG. 6. A source terminal of semiconductor switch input transistor 261 is connected to a body terminal of semiconductor switch input transistor 261, to a source terminal of semiconductor switch output transistor 262, to a body terminal of semiconductor switch output transistor 262, to a first terminal of current-limiting element 264, and to a first terminal of voltage clamp circuit 267 at node 270. A drain terminal of control transistor 263 is connected to a gate terminal of semiconductor switch input transistor 261, to a gate terminal of semiconductor switch output transistor 262, to a second terminal of current-limiting element 264, and to a second terminal of voltage clamp circuit 267 at node 271. Control terminal 273 is connected to a gate terminal of control transistor 263. A body terminal of control transistor 263 is connected to a ground terminal. As an example, in reference to FIG. 6, the body terminal can be connected to first power source terminal 631. A source terminal of control transistor 263 is connected to a first terminal of current-limiting element 265 at node 274. As second terminal of current-limiting element 265 is connected to a ground terminal. As an example, in reference to FIG. 6, the second terminal of current-limiting element 265 can be connected to first power source terminal 631.

Current-limiting circuits can compromise current-limiting elements. Current-limiting elements 264 and 265 may be implemented with a device having a linear relationship of voltage and current, such as a resistor. Voltage clamp circuit 267 may be implemented with a device having a nonlinear relationship of voltage and current, such as a semiconductor junction. For example, a Zener diode or an avalanche diode may be used to implement a voltage clamp circuit. In such case, the first terminal of voltage clamp circuit 267 may be the cathode terminal, and the second terminal may be the anode terminal. As another example, a symmetric nonlinear device, such as a varistor or bilateral transient voltage suppressor, may be used to implement voltage clamp circuit 267.

In accordance with one example, all of semiconductor switches 601, 602, 603, 604, 605, 606, 607, and 608 may be of a similar type. As an example, all of semiconductor switches 601, 602, 603, 604, 605, 606, 607, and 608 may be of a type shown in FIG. 7.

Figure 8:
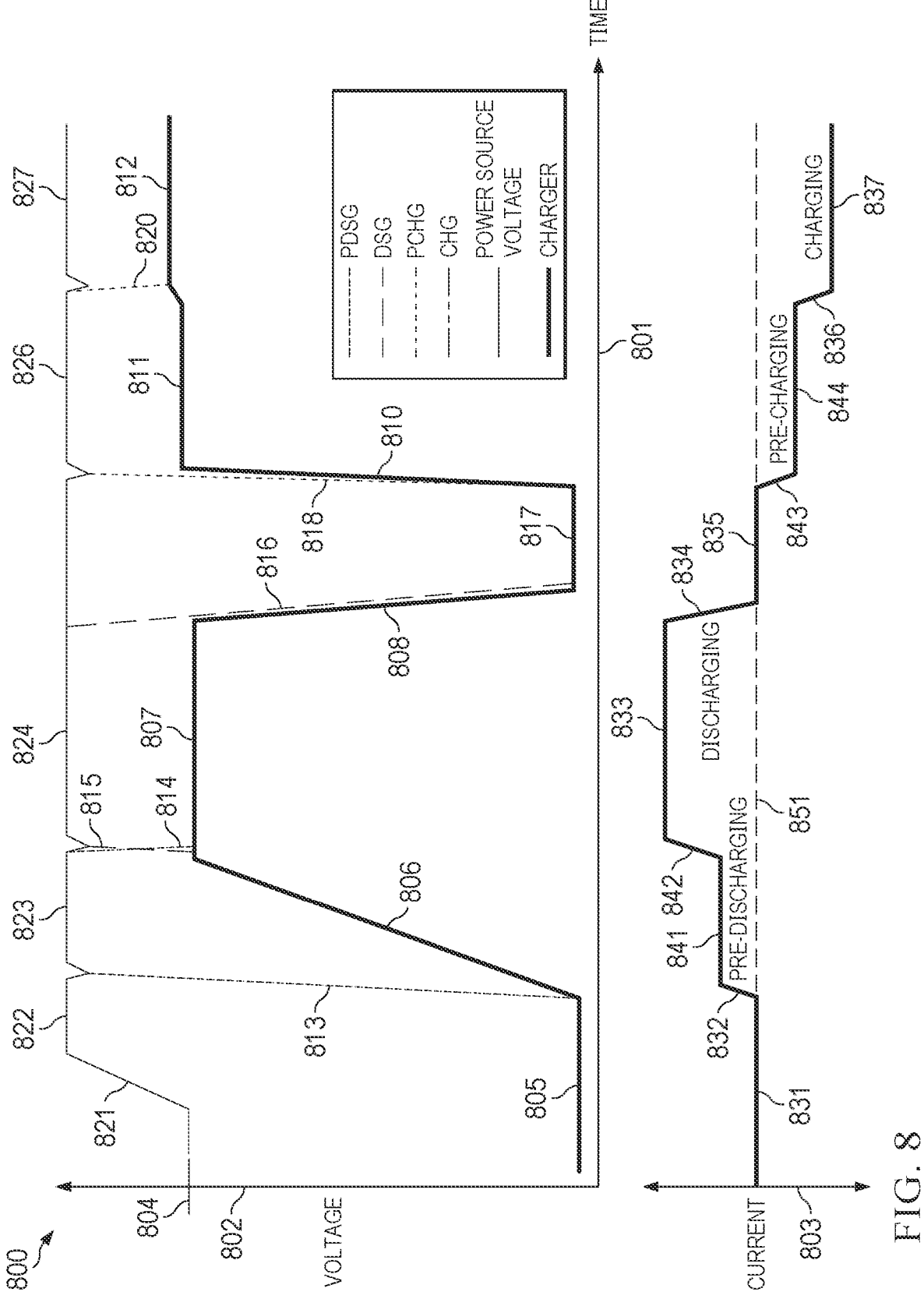
FIG. 8 is a timing diagram illustrating signals in accordance with some aspects of the present disclosure.

FIG. 8 is a timing diagram illustrating signals in accordance with some aspects of the present disclosure. Timing diagram 800 shows voltage signals with respect to time axis 801 and voltage axis 802 and current flow with respect to time axis 801 and current axis 803. A power source voltage 804 (e.g., a battery voltage) is shown at a level along voltage axis 802. Initially, charge pump 611 is off, and the charge pump output voltage at charge pump output terminal 637 is an initial voltage, such as power source voltage 804. When charge pump 611 is activated, the charge pump output voltage at charge pump output terminal 637 rises, as shown by rising voltage 821. The charge pump output voltage remains substantially at the desired higher voltage, as shown by voltage 822, voltage 823, voltage 824, voltage 826, and voltage 827. The charge pump output voltage may dip slightly, as shown between voltage 822 and voltage 823, between voltage 823 and 824, between voltage 824 and voltage 826, and between voltage 826 and voltage 827, for example, when a semiconductor switch closes to drive the gate of pre-charging circuit transistor 615 or charging circuit transistor 617.

The output voltage at fourth output terminal 644 is initially at a low voltage (e.g., zero volts) as shown by voltage 805. When semiconductor switch 608 of FIG. 6 is activated, the output voltage at fourth output terminal 644 rises, as shown by rising voltage 813. The output voltage at fourth output terminal 644 remains high (e.g., at the charge pump output voltage), as shown by voltage 823, during a pre-discharging period. The output voltage at fourth output terminal 644 then falls, as shown by declining voltage 814, at the end of the pre-discharging period. The output voltage at third output terminal 643 is initially at a low voltage (e.g., zero volts). When semiconductor switch 606 of FIG. 6 is activated, the output voltage at third output terminal 643 rises, as shown by rising voltage 815. The output voltage at third output terminal 643 remains high (e.g., at the charge pump output voltage), as shown by voltage 824, during a discharging period. The output voltage at third output terminal 643 then falls, as shown by declining voltage 816, at the end of the discharging period. When semiconductor switch 604 of FIG. 6 is activated, the output voltage at second output terminal 642 rises, as shown by rising voltage 818. The output voltage at second output terminal 642 remains high (e.g., at the charge pump output voltage), as shown by voltage 826, during the pre-charging period. When semiconductor switch 604 of FIG. 6 is deactivated, the output voltage at second output terminal 642 falls, as shown by falling voltage 820.

A voltage at power supply and load terminal 650 is initially at a low voltage (e.g., zero volts), as shown by voltage 805. When semiconductor switch 608 of FIG. 6 is activated, the voltage rises, as shown by rising voltage 806, to the power source voltage 804 and remains at that voltage, as shown by voltage 807. When semiconductor switch 608 of FIG. 6 is deactivated and semiconductor switch 606 is activated, the voltage remains at the level, as shown by voltage 807. When semiconductor switch 606 is deactivated, the voltage falls rapidly, as shown by falling voltage 808 to a low voltage (e.g., zero volts), as shown by voltage 817. When semiconductor switch 604 is activated, the voltage rises, as shown by rising voltage 810, to a steady voltage (e.g., at or slightly below power source voltage 804), as shown by voltage 811. When semiconductor switch 604 is deactivated and semiconductor switch 602 is activated, the voltage remains approximately the same or rises slightly to a steady voltage (e.g., power source voltage 804), as shown by steady voltage 812.

The respective segments of current flow can be seen in relation to current axis 803. Before semiconductor switch 608 is activated, current flow is at zero, as shown by current level 831. When semiconductor switch 608 is activated, current flow changes to pre-discharging, as shown by increasing discharging current 832 followed by steady, but limited, discharging current 841. When semiconductor switch 608 is deactivated and semiconductor switch 606 is activated, the pre-discharging current is replaced by the discharging current, as shown by increasing discharging current 842 followed by steady discharging current 833. When semiconductor switch 606 is deactivated, the discharging current falls, as shown by declining discharging current 834 followed by current 835 returning to baseline current level 851 (e.g., zero current). When semiconductor switch 604 is activated, current flow changes to pre-charging, as shown by increasing charging current 843, followed by steady, but limited, charging current 844. When semiconductor switch 604 is deactivated and semiconductor switch 602 is activated, the pre-charging current is replaced by the charging current, as shown by increasing charging current 836 followed by steady charging current 837.

Figure 9:
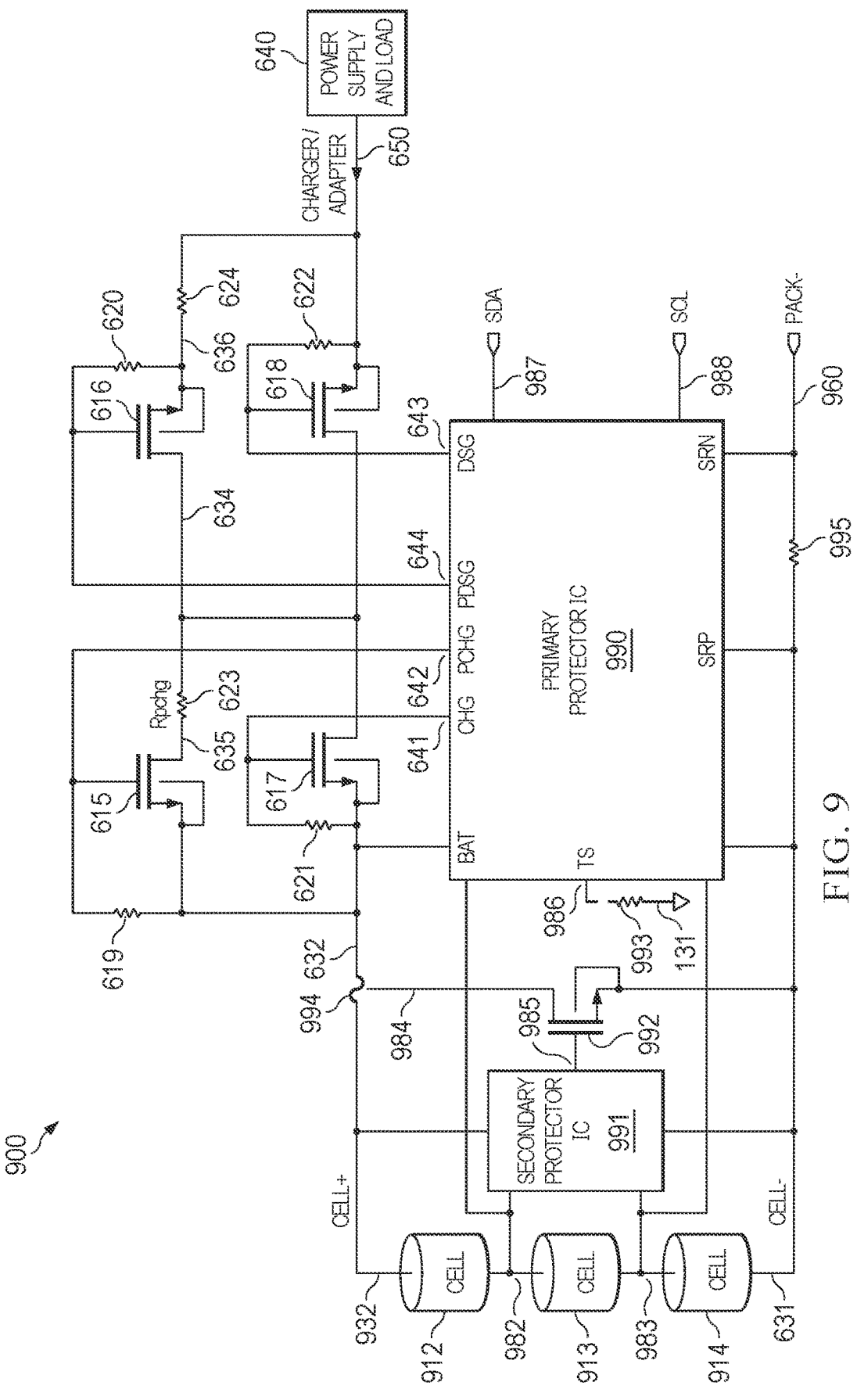
FIG. 9 is a schematic diagram illustrating an apparatus in accordance with some aspects of the present disclosure.

FIG. 9 is a schematic diagram illustrating an apparatus in accordance with some aspects of the present disclosure. Apparatus 900 implements an energy management system. Apparatus 900 comprises primary protector integrated circuit 990, secondary protector integrated circuit 991, a power source comprising cell 912, cell 913, and cell 914, a pre-charging circuit comprising pre-charging circuit transistor 615, current-limiting element 619, and current-limiting element 623, a charging circuit comprising charging circuit transistor 617 and current-limiting element 621, a pre-discharging circuit comprising pre-discharging circuit transistor 616, current-limiting element 620, and current-limiting element 624, a discharging circuit comprising discharging circuit transistor 618 and current-limiting element 122, protective switch 994, protective switch control transistor 992, thermal sensor 993, ammeter shunt 995, and power supply and load 640. A first output terminal 641 of primary protector IC 990 is connected to a gate terminal of charging circuit transistor 617 and to a first terminal of current-limiting element 621. A second output terminal 642 of primary protector IC 990 is connected to a gate terminal of pre-charging circuit transistor 615 and to a first terminal of current-limiting element 619. A third output terminal 643 of primary protector IC 990 is connected to a gate terminal of discharging circuit transistor 618 and to a first terminal of current-limiting element 622. A fourth output terminal 644 of primary protector IC 990 is connected to a gate terminal of pre-discharging circuit transistor 616 and to a first terminal of current-limiting element 620. Power supply and load 640 provides a power supply output at power supply and load terminal 650, which is connected to a first terminal of current-limiting element 624. A second terminal of current-limiting element 624 is connected to a source terminal of pre-discharging circuit transistor 616, to a body terminal of pre-discharging circuit transistor 616, and to a second terminal of current-limiting element 620 at node 636. A drain terminal of pre-discharging circuit transistor 616 is connected to central node 634. Power supply and load terminal 650 is connected to a source terminal of discharging circuit transistor 618, to a body terminal of discharging circuit transistor 618, and to a second terminal of current-limiting element 622. A drain terminal of discharging circuit transistor 618 is connected to central node 634. Central node 634 is connected to a first terminal of current-limiting element 623. A second terminal of current-limiting element 623 is connected to a drain terminal of pre-charging circuit transistor 615 at node 635. A source terminal of pre-charging circuit transistor 615 is connected to a second terminal of current-limiting element 619, to a body terminal of pre-charging circuit transistor 615, and to second power source terminal 632. Central node 634 is connected to a drain terminal of charging circuit transistor 617. A source terminal of charging circuit transistor 617 is connected to a second terminal of current-limiting element 621, to a body terminal of charging circuit transistor 617, and to second power source terminal 632.

First power source terminal 631 is connected to a terminal of cell 914. An opposite terminal of cell 914 is connected to node 983, which is connected to a terminal of cell 913, to primary protector IC 990, and to secondary protector IC 991. An opposite terminal of cell 913 is connected to node 982, which is connected to a terminal of cell 912, to primary protector IC 990, and to secondary protector IC 991. An opposite terminal of cell 912 is connected to second power source terminal 932. Second power source terminal 932 is connected to secondary protector IC 991 and to a first terminal of protective switch 994. A second terminal of protective switch 994 is connected to power source terminal 632 of primary protector IC 590.

Secondary protector IC 991 provides a protective switch control signal to a gate terminal of protective switch control transistor 992 at protective switch control output 985. A drain terminal of protective switch control transistor 992 is connected to a protective switch control input 984 of protective switch 994. A source terminal of protective switch control transistor 992 is connected to first power source terminal 631 and to a body terminal of protective switch control transistor 992. First power source terminal 631 is connected to secondary protector IC 991, to primary protector IC 990, and to a first terminal of ammeter shunt 995. A second terminal of ammeter shunt 995 is connected to power supply reference terminal 960. Power supply reference terminal 960 is connected to primary protector IC 990 and to power supply and load 640. Primary protector IC 990 is connected to a first terminal of thermal sensor 993 at thermal sensor input 986. A second terminal of thermal sensor 993 is connected to first power source terminal 631.

As an example, thermal sensor 993 can be a temperature sensor, such as a thermistor or a semiconductor temperature sensor. As an example, protective switch 994 can be a circuit interrupter, such as a fuse, a circuit breaker, a transistor, or another semiconductor device capable of reliably interrupting current flow. When not interrupting current flow, protective switch 994 provides conduction with low resistance, making power source terminal 932 functionally identical to second power source terminal 632 with regard to the description of second power source terminal 632 with respect to FIG. 6. Ammeter shunt 995 provides conduction with low resistance, making power supply reference terminal 960 functionally identical to first power source terminal 631 with regard to the description of first power source terminal 631 with respect to FIG. 6. A serial interface comprising serial data line 987 and serial clock line 988 is connected to primary protector IC 990.

Figure 10:
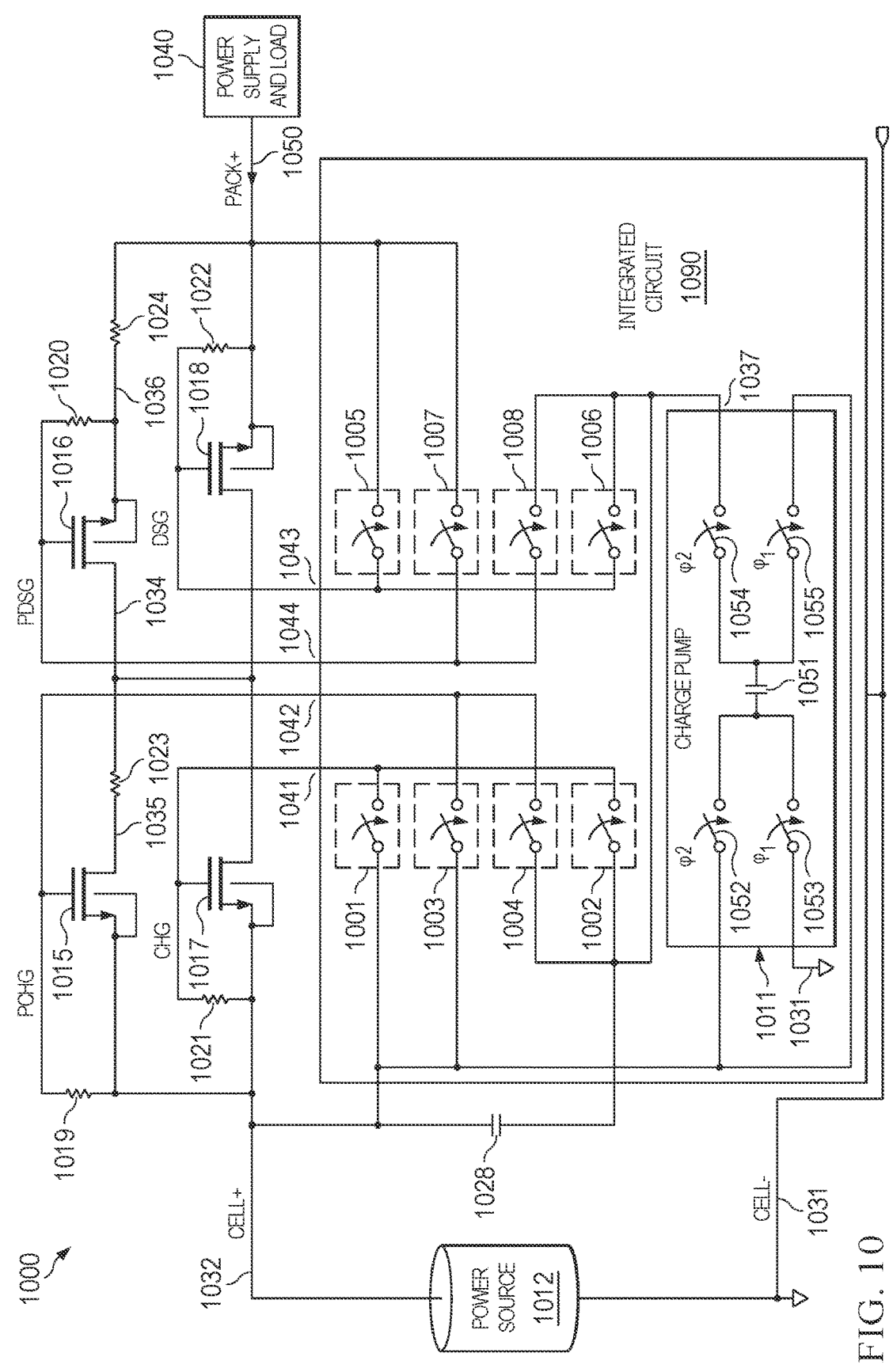
FIG. 10 is a schematic diagram illustrating an apparatus in accordance with some aspects of the present disclosure.

FIG. 10 is a schematic diagram illustrating an apparatus in accordance with some aspects of the present disclosure. Apparatus 1000 comprises a circuit. The circuit may be used to implement an energy management system. The circuit comprises a switch matrix, charge pump 1011, power source 1012, power supply and load 1040, charging circuit transistor 1017, current-limiting element 1021, discharging circuit transistor 1018, current-limiting element 1022, pre-charging circuit transistor 1015, current-limiting element 1019, current-limiting element 1023, pre-discharging circuit transistor 1016, current-limiting element 1020, and current-limiting element 1024. As an example, charging circuit transistor 1017, discharging circuit transistor 1018, pre-charging circuit transistor 1015, pre-discharging circuit transistor 1016 can be n-channel field-effect transistors (nFETs). The switch matrix comprises semiconductor switch 1001, semiconductor switch 1002, semiconductor switch 1003, semiconductor switch 1004, semiconductor switch 1005, semiconductor switch 1006, semiconductor switch 1007, semiconductor switch 1008. Charge pump 1011 comprises capacitor 1051, semiconductor switch 1052, semiconductor switch 1053, semiconductor switch 1054, and semiconductor switch 1055. As an example, charge pump 1011, semiconductor switch 1001, semiconductor switch 1002, semiconductor switch 1003, semiconductor switch 1004, semiconductor switch 1005, semiconductor switch 1006, semiconductor switch 1007, and semiconductor switch 1008 can be incorporated into integrated circuit 1090.

Power source 1012 has a first power source terminal 1031 and a second power source terminal 1032. As an example, first power source terminal 1031 can provide a ground voltage for apparatus 1000. Thus, first power source terminal 1031 can be referred to as a ground terminal. Second power source terminal 1032 can be connected to integrated circuit 1090. As an example, second power source terminal 1032 can provide a supply voltage, such as a ground voltage, which can serve as a reference voltage with respect to one or more other supply voltages. Second power source terminal 1032 can also be connected to other elements, such as power supply and load 1040. Second power source terminal 1032 is connected to charge pump 1011. A first charge pump semiconductor switch 1052 has a first charge pump semiconductor switch input, which is connected to second power source terminal 1032. A second charge pump semiconductor switch input of second charge pump semiconductor switch 1053 is connected to first power source terminal 1031. A first charge pump semiconductor switch output of first charge pump semiconductor switch 1052 and a second charge pump semiconductor switch output of second charge pump semiconductor switch 1053 are connected to a first capacitor terminal of capacitor 1051. A third charge pump semiconductor switch input of third charge pump semiconductor switch 1054 is connected to a second capacitor terminal of capacitor 1051. A fourth charge pump semiconductor switch input of fourth charge pump semiconductor switch 1055 is connected to second power source terminal 1032. A third charge pump semiconductor switch output of third charge pump semiconductor switch 1054 provides a charge pump output at a charge pump output voltage. As an example, the charge pump output voltage can be higher than the power source voltage of power source 1012. A fourth charge pump semiconductor switch output of fourth charge pump semiconductor switch 1055 is connected to the second capacitor terminal of capacitor 1051. Optionally, a capacitor 1028 can have a first terminal connected to second power source terminal 1032 and a second terminal connected to charge pump output terminal 1037. The capacitor can be referred to as a reservoir capacitor, the first terminal can be referred to as a first reservoir capacitor terminal, and the second terminal can be referred to as a second reservoir capacitor terminal.

Figure 11:
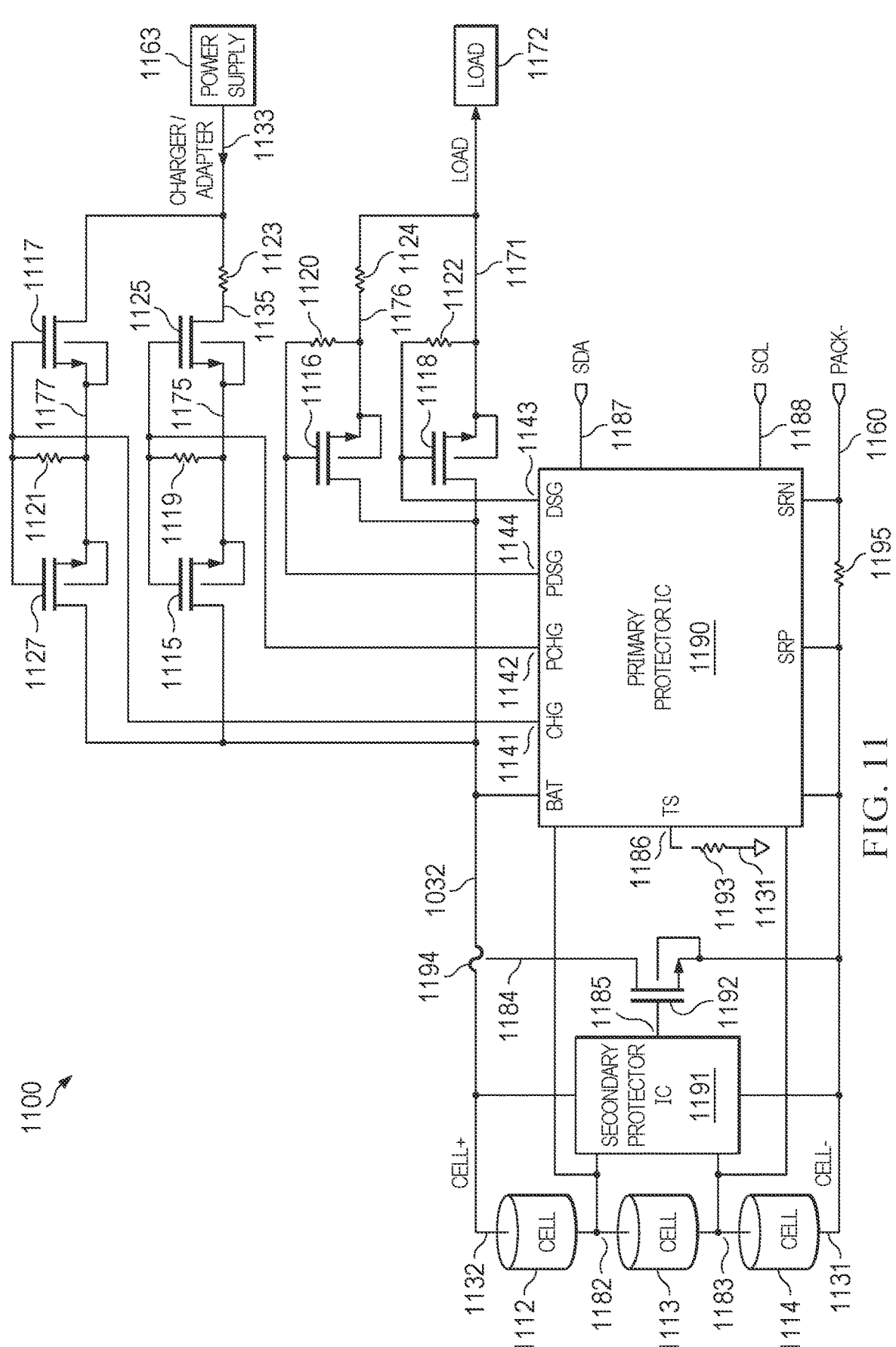
FIG. 11 is a schematic diagram illustrating an apparatus in accordance with some aspects of the present disclosure.

First semiconductor switch 1001 has a first semiconductor switch input connected to second power source terminal 1032 and a first semiconductor switch output connected to first output terminal 1041. Second semiconductor switch 1002 has a second semiconductor switch input connected to charge pump output terminal 1037 and a second semiconductor switch input connected to first output terminal 1041. Third semiconductor switch 1003 has a third semiconductor switch input connected to second power source terminal 1032 and a third semiconductor switch input connected to second output terminal 1042. Fourth semiconductor switch 1002 has a fourth semiconductor switch input connected to charge pump output terminal 1037 and a fourth semiconductor switch input connected to second output terminal 1042. In the context of FIGS. 10 and 11, a fifth semiconductor switch 1005 has a fifth semiconductor switch input connected to power supply and load terminal 1050 and a fifth semiconductor switch output connected to third output terminal 1043. In the context of FIGS. 10 and 11, a sixth semiconductor switch 1006 has a sixth semiconductor switch input connected to charge pump output terminal 1037 and a sixth semiconductor switch output connected to third output terminal 1043. A seventh semiconductor switch 1007 has a seventh semiconductor switch input connected to power supply and load terminal 1050 and a seventh semiconductor switch output connected to fourth output terminal 1044. An eighth semiconductor switch 1008 has an eighth semiconductor switch input connected to charge pump output terminal 1037 and an eighth semiconductor switch output connected to fourth output terminal 1044. As an example, first semiconductor switch 601 and third semiconductor switch 603 may be implemented as shown in FIG. 2, and second semiconductor switch 602, fourth semiconductor switch 604, fifth semiconductor switch 605, sixth semiconductor switch 606, seventh semiconductor switch 607, and eighth semiconductor switch 608 may be implemented as shown in FIG. 7.

A circuit for switching a pre-charging current flow can be connected to second output terminal 1042. A pre-charging current can be provided by the power supply of power supply and load 1040, which can be connected to power supply power supply and load terminal 1050. As an example, third output terminal 1043 can provide a control signal to activate a discharging circuit comprising discharging circuit transistor 1018 to provide a connection of power supply and load terminal 1050 to central node 1034. Central node 1034 is connected to a first terminal of current-limiting element 1023. A second terminal of current-limiting element 1023 is connected to a drain terminal of pre-charging circuit transistor 1015 at node 1035. Second output terminal 1042 is connected to a gate terminal of pre-charging circuit transistor 1015 and to a first terminal of current-limiting element 1019. A source terminal of pre-charging circuit transistor 1015 is connected to a second terminal of current-limiting element 1019 and to second power source terminal 1032. A pre-charging current from power supply and load 1040 is provided to second power source terminal 1032 when semiconductor switches 1003 and 1004 operate to control the switching of the pre-charging current by pre-charging circuit transistor 1015.

A circuit for switching a charging current flow can be connected to first output terminal 1041. A charging current can be provided by the power supply of power supply and load 1040, which can be connected to power supply power supply and load terminal 1050. As an example, third output terminal 1043 can provide a control signal to activate a discharging circuit comprising discharging circuit transistor 1018 to provide a connection of power supply and load terminal 1050 to central node 1034. Central node 1034 is connected to a drain terminal of charging circuit transistor 1017. First output terminal 1041 is connected to a gate terminal of charging circuit transistor 1017 and to a first terminal of current-limiting element 1021. A source terminal of charging circuit transistor 1017 is connected to a second terminal of current-limiting element 1021 and to second power source terminal 1032. A charging current from power supply and load terminal 1050 is provided to second power source terminal 1032 when semiconductor switches 1001 and 1002 operate to control the switching of the charging current by charging circuit transistor 1017.

A circuit for switching a pre-discharging current flow can be connected to power supply and load terminal 1050. A pre-discharging current can be provided to power supply and load 1040 which can be connected to power supply and load terminal 1050. Fourth output terminal 1044 is connected to a gate terminal of pre-discharging circuit transistor 1016 and to a first terminal of current-limiting element 1020. Power supply and load terminal 1050 is connected to a first terminal of current-limiting element 1024. A second terminal of current-limiting element 1024 is connected to a source terminal of pre-discharging circuit transistor 1016 and to a second terminal of current-limiting element 1020 at node 1036. A drain terminal of pre-discharging circuit transistor 1016 is connected to central node 1034. Second power source terminal 1032 can be connected to the drain terminal of pre-discharging circuit transistor 1016 via a charging circuit comprising charging circuit transistor 1017. Power source 1012 provides a pre-discharging current to power supply and load 1040 when semiconductor switches 1007 and 1008 operate to control the switching of the pre-discharging current by pre-discharging circuit transistor 1016.

A circuit for switching a discharging current flow can be connected to power supply and load terminal 1050. A discharging current can be provided to power supply and load 1040, which can be connected to power supply and load terminal 1050. Third output terminal 1043 is connected to a gate terminal of discharging circuit transistor 1018 and to a first terminal of current-limiting element 1022. Power supply and load terminal 1050 is connected to a source terminal of discharging circuit transistor 1018 and to a second terminal of current-limiting element 1022. A drain terminal of discharging circuit transistor 1018 is connected to central node 1034. Second power source terminal 1032 can be connected to the drain terminal of discharging circuit transistor 1018 via a charging circuit comprising charging circuit transistor 1017. Power source 1012 provides a discharging current to power supply and load terminal 1050 when semiconductor switches 1005 and 1006 operate to control the switching of the discharging current by discharging circuit transistor 1018.

As an example, semiconductor switches 1002, 1004, 1005, 1006, 1007, and 1008 may be of one type (e.g., as shown in FIG. 7), semiconductor switches 1001 and 1003 may be of a different type (e.g., as shown in FIG. 2). The use of eight semiconductor switches, with four semiconductor switches connected to charge pump output terminal 1037, allows the use of nFETs without the need for p-channel field-effect transistors (pFETs) for transistors 1015, 1016, 1017, and 1018. The use of semiconductor switches of the type shown in FIG. 2 for semiconductor switches 1001 and 1003 can enhance protection against fault conditions.

While FIG. 10 is illustrated as comprising a pre-charging circuit, a charging circuit, a pre-discharging circuit, and a discharging circuit, it should be understood that a subset of such circuit can be implemented. As an example, an apparatus may provide semiconductor switches to drive output terminals for a pre-charging circuit, a charging circuit, and a discharging circuit, but not a pre-discharging circuit. As another example, an apparatus may provide semiconductor switches to drive output terminals for a charging circuit, a pre-discharging circuit, and a discharging circuit, but not a pre-charging circuit. Other subsets are also possible.

FIG. 11 is a schematic diagram illustrating an apparatus in accordance with some aspects of the present disclosure. Apparatus 1100 implements an energy management system. Apparatus 1100 comprises primary protector integrated circuit 1190, secondary protector integrated circuit 1191, a power source comprising cell 1112, cell 1113, and cell 1114, a pre-charging circuit comprising pre-charging circuit input transistor 1125, pre-charging circuit output transistor 1115, current-limiting element 1119, and current-limiting element 1123, a charging circuit comprising charging circuit input transistor 1117, charging circuit output transistor 1127, and current-limiting element 1121, a pre-discharging circuit comprising pre-discharging circuit transistor 1116, current-limiting element 1120, and current-limiting element 1124, a discharging circuit comprising discharging circuit transistor 1118 and current-limiting element 1122, protective switch 1194 protective switch control transistor 1192, thermal sensor 1193, ammeter shunt 1195, power supply 1163, and load 1172. As an example, charging circuit input transistor 1117, discharging circuit transistor 1118, pre-charging circuit output transistor 1115, pre-discharging circuit transistor 1116 can be n-channel field-effect transistors (nFETs). A first output terminal 1141 of primary protector IC 1190 is connected to a gate terminal of charging circuit input transistor 1117, to a gate terminal of charging circuit output transistor 1127, and to a first terminal of current-limiting element 1121. A second output terminal 1142 of primary protector IC 1190 is connected to a gate terminal of pre-charging circuit input transistor 1125, to a gate terminal of pre-charging circuit output transistor 1115, and to a first terminal of current-limiting element 1119. A third output terminal 1143 of primary protector IC 1190 is connected to a gate terminal of discharging circuit transistor 1118 and to a first terminal of current-limiting element 1122. A fourth output terminal 1144 of primary protector IC 1190 is connected to a gate terminal of pre-discharging circuit transistor 1116 and to a first terminal of current-limiting element 1120. Power supply 1163 provides a power supply output at power supply terminal 1133, which is connected to a first terminal of current-limiting element 1123. A second terminal of current-limiting element 1123 is connected to a drain terminal of pre-charging circuit input transistor 1125 at node 1135. A source terminal of pre-charging circuit input transistor 1125 is connected to a body terminal of pre-charging circuit input transistor 1125, to a source terminal of pre-charging circuit output transistor 1115, and to second terminal of current-limiting element 1119 at node 1175. A drain terminal of pre-charging circuit output transistor 1115 is connected to power source terminal 1032.

Power supply terminal 1133 is connected to a drain terminal of charging circuit input transistor 1117. A source terminal of charging circuit input transistor 1117 is connected to a body terminal of charging circuit input transistor 1117, to a source terminal of charging circuit output transistor 1127, to a body terminal of charging circuit output transistor 1127, and to a second terminal of current-limiting element 1121 at node 1177. A drain terminal of charging circuit output transistor 1127 is connected to power source terminal 1032.

Power source terminal 1032 is connected to a drain terminal of pre-discharging circuit transistor 1116. A source terminal of pre-discharging circuit transistor 1116 is connected to a body terminal of pre-discharging circuit transistor 1116, to a second terminal of current-limiting element 1120, and to a first terminal of current-limiting element 1124 at node 1176. A second terminal of current-limiting element 1124 is connected to load terminal 1171, which is connected to load 1172.

Power source terminal 1032 is connected to a drain terminal of discharging circuit transistor 1118. A source terminal of discharging circuit transistor 1118 is connected to a body terminal of discharging circuit transistor 1118, to a second terminal of current-limiting element 1122, and to load terminal 1171.

First power source terminal 1131 is connected to a terminal of cell 1114. An opposite terminal of cell 1114 is connected to node 1183, which is connected to a terminal of cell 1113, to primary protector IC 1190, and to secondary protector IC 1191. An opposite terminal of cell 1113 is connected to node 1182, which is connected to a terminal of cell 1112, to primary protector IC 1190, and to secondary protector IC 1191. An opposite terminal of cell 1112 is connected to second power source terminal 1132. Second power source terminal 1132 is connected to secondary protector IC 1191 and to a first terminal of protective switch 1194. A second terminal of protective switch 1194 is connected to power source terminal 1132 of primary protector IC 1190.

Secondary protector IC 1191 provides a protective switch control signal to a gate terminal of protective switch control transistor 1192 at protective switch control output 1185. A drain terminal of protective switch control transistor 1192 is connected to a protective switch control input 1184 of protective switch 1194. A source terminal of protective switch control transistor 1192 is connected to first power source terminal 1131 and to a body terminal of protective switch control transistor 1192. First power source terminal 1131 is connected to secondary protector IC 1191, to primary protector IC 1190, and to a first terminal of ammeter shunt 1195. A second terminal of ammeter shunt 1195 is connected to power supply reference terminal 1160. Power supply reference terminal 1160 is connected to primary protector IC 1190 and to power supply 1163 and load 1172. Primary protector IC 1190 is connected to a first terminal of thermal sensor 1193 at thermal sensor input 1186. A second terminal of thermal sensor 1193 is connected to first power source terminal 1131.

As an example, thermal sensor 1193 can be a temperature sensor, such as a thermistor or a semiconductor temperature sensor. As an example, protective switch 1194 can be a circuit interrupter, such as a fuse, a circuit breaker, a transistor, or another semiconductor device capable of reliably interrupting current flow. When not interrupting current flow, protective switch 1194 provides conduction with low resistance, making power source terminal 1132 functionally identical to second power source terminal 1032 with regard to the description of second power source terminal 1032 with respect to FIG. 10. Ammeter shunt 1195 provides conduction with low resistance, making power supply reference terminal 1160 functionally identical to first power source terminal 1131 or first power source terminal 1031 as described with respect to FIG. 10. A serial interface comprising serial data line 1187 and serial clock line 1188 is connected to primary protector IC 1190.

While FIG. 11 is illustrated as comprising a pre-charging circuit, a charging circuit, a pre-discharging circuit, and a discharging circuit, it should be understood that a subset of such circuit can be implemented. As an example, an apparatus may provide semiconductor switches to drive output terminals for a pre-charging circuit, a charging circuit, and a discharging circuit, but not a pre-discharging circuit. As another example, an apparatus may provide semiconductor switches to drive output terminals for a charging circuit, a pre-discharging circuit, and a discharging circuit, but not a pre-charging circuit. Other subsets are also possible.

Figure 12:
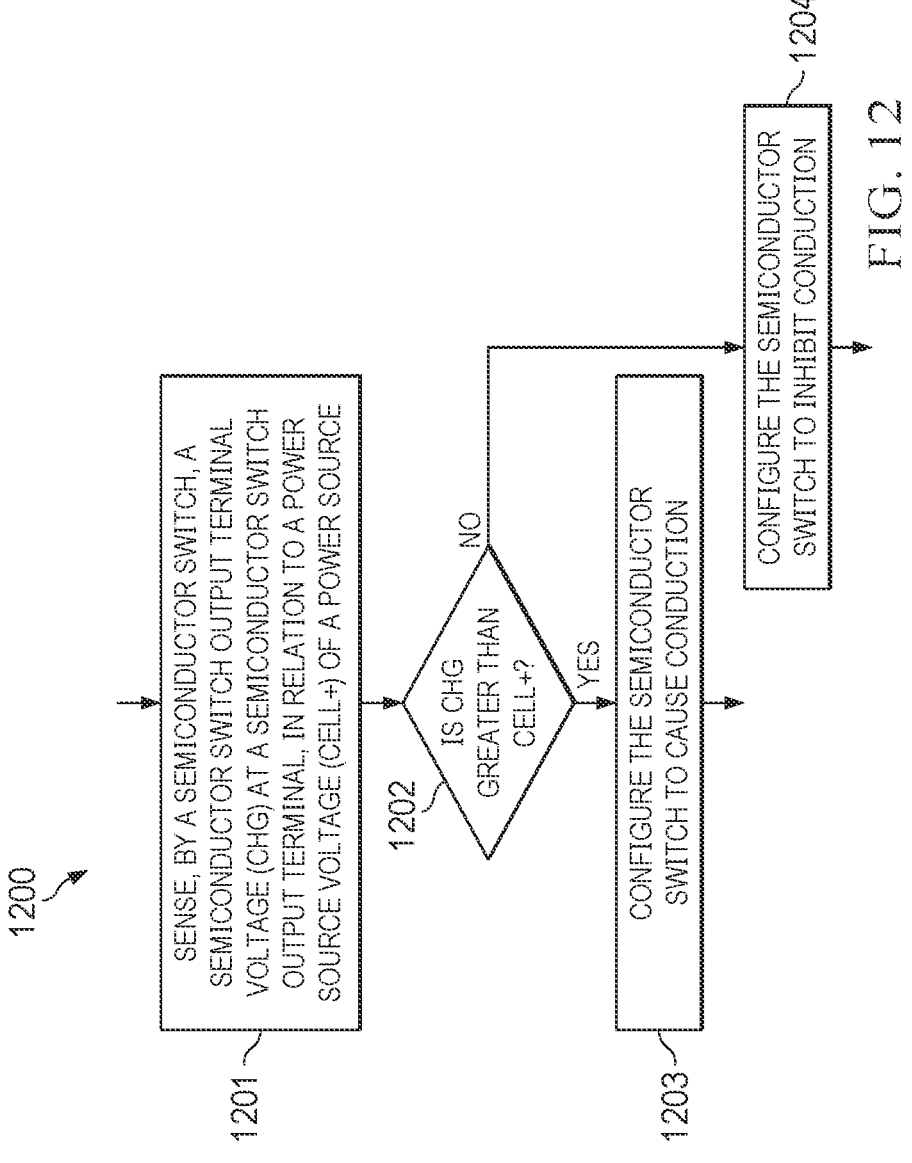
FIG. 12 is a flow diagram illustrating a method in accordance with some aspects of the present disclosure.

FIG. 12 is a flow diagram illustrating a method in accordance with some aspects of the present disclosure. Method 1200 comprises block 1201, decision block 1202, block 1203, and block 1204. At block 1201, sensing, by a semiconductor switch, a semiconductor switch output terminal voltage (e.g., CHG) at a semiconductor switch output terminal is performed. The sensing may be in relation to a power source voltage (e.g., CELL+) of a power source. From block 1201, method 1200 continues to decision block 1202. At decision block 1202, a decision is made as to whether or not the semiconductor switch output terminal voltage (e.g., CHG) is greater than the power source voltage (e.g., CELL+). If so, method 1200 continues to block 1203. At block 1203, configuring of the semiconductor switch to cause conduction occurs. If not, method 1200 continues from decision block 1202 to block 1204. At block 1204, configuring of the semiconductor switch to inhibit conduction is performed. As an example, the method of FIG. 12 can be performed using an electrical circuit. For example, with reference to semiconductor switch 200 of FIG. 2, elements such as current-limiting element 266 and semiconductor switch output transistor 262 can be used to perform the method. As another example, control transistor 263 can be used to control operation of semiconductor switch 200. As a further example, current-limiting element 264 can equalize voltages at its terminals, for example, when control transistor 263 is in a non-conducting state. As yet another example, voltage clamp circuit 267 and voltage clamp circuit 268 can limit voltages across their terminals.

FIG. 13 is a flow diagram illustrating a method in accordance with some aspects of the present disclosure. Method 1300 comprises block 1301, block 1302, block 1303, and block 1304. At block 1301, a first semiconductor switch path is provided to selectively couple a charge pump output voltage to a pre-charge n-channel field-effect transistor (nFET) control output terminal. At block 1302, a second semiconductor switch path is provided to selectively couple a charge pump output voltage to a charge nFET control output terminal. At block 1303, a third semiconductor switch path is provided to selectively couple a charge pump output voltage to a pre-discharge nFET control output terminal. At block 1304, a fourth semiconductor switch path is provided to selectively couple a charge pump output voltage to a discharge nFET control output terminal.

In accordance with at least one embodiment, a multi-function high side FET driver circuit can be provided. In a battery management system, a pair of series FETs can be used as protector to inhibit flow of current under fault conditions. The pair of series FETs can enable connection and isolation of a battery pack between a load and a charger. The protector can utilize nFETs for cost saving. With the nFETs being in series, the charging and discharging current is carried by both FETs. The output of the FETs is both the charging source and discharging sink (system load).

An integrated circuit includes a charge pump source to drive the gates of the high side nFETs above the battery source voltage. There can either be two charge pumps or a single shared charge pump depending upon the topology.

In some applications there is a desire to use parallel nFETs where the charging nFET carries only charging current and connects to only the charge source. For example, the charging nFET may be configured not to carry discharging current, and the charging nFET need not be connected to a load to which discharging current is discharged.

A integrated driver that can be configured for use with either a parallel nFET configuration or a series nFET configuration can avoid a need for extra pins or charge pumps. A charging source path that provides protection against short circuits can make the charging nFET immune to damage from a fault condition.

A charging circuit (CHG) nFET gate can be driven off using the battery voltage (CELL+). A discharging circuit (DSG) nFET gate can be driven off using the charger or system load voltage (Charger). The charge pump or charge pumps can be interfaced to the CHG and DSG nFETs through parallel pairs of switches. However, without other feature as described herein, in a parallel nFET configuration, the CHG nFET can be vulnerable to short circuits to ground on Charger. As an example, in such a situation, the CHG nFET body diode can carry a short circuit current from the power source and be destroyed. The CHG nFET body diode direction can be countered by adding a diode in the opposite direction in series with the charging path. However, the substantial forward voltage of such an additional diode conducting charging current can dissipate power and reduce efficiency.

Features can be provided to implement protection in an efficient manner. A parallel nFET configuration can include a second high side nFET in series with the charging current path. The second nFET can block the short circuit current if PACK+ has a fault to ground. A semiconductor switch connected to the power source (CELL+) can be configured to allow the CHG nFET gate voltage to be high impedance if it is driven externally below the voltage of the power source. The gate of the drain extended pFET that connects to the CHG nFET gate voltage can be connected to the power source. A clamping circuit between the power source and the gate of the drain extended pFET can provide protection of the gate voltage when the charge pump is actively driving the external voltage substantially above the power source. During a short circuit event, the external gate-to-source resistor equalizes the common nFET gate voltage to the common nFET source voltage. The common voltage equalizes with the charge source voltage (Charger) to stop current flow through the power source.

Providing a semiconductor switch configured as shown in FIG. 2, which can be connected between the nodes designated CHG and Charger, enables support for both series and parallel nFET configurations with the same pins of an integrated circuit being able to be connected to and to drive either configuration of nFETs. The path from CHG to Charger can have a low impedance when the voltage of the CHG node is above the voltage of the power source and can have a high impedance when the voltage of the CHG node is below the voltage of the power source.

As an example, a charge pump reservoir (e.g., a capacitor) is pre-charged before being connected to either a charging circuit nFET gate or a discharging circuit nFET gate. A rapid rise time of the voltage at the CHG node can occur when a semiconductor switch for the charging circuit of type shown in FIG. 2 is activated. When a semiconductor switch of the type shown in FIG. 2 is deactivated, the fall time of the voltage at the CHG node can be rapid to the power source voltage and then can be a slower equalization through the gate of the charging circuit nFET through the source resistor to a voltage well below the power source voltage during a short-circuit fault.

As an example, a system that involves charging and discharging a battery or power source with protection nFETs (e.g., high side protection nFETs) can be implemented using a circuit as disclosed herein. A system can provide separate paths for battery charging and discharging.

In accordance to at least one embodiment, a pair of series nFETs in a common source configuration with the gates connected to the common source through a resistor can be disposed in a current path of an energy management system. As an example, such a pair of series nFETs can be used in a charging circuit. The nFETs are connected in series with a power source and a charging source. The gates of the nFETs are coupled to a charge pump and a switch that connects the gates to the power source when turned on. The switch is constructed in a manner that, when turned on, allows the gate voltage to be presented with a low impedance path when a charging voltage is above a power source voltage of the power source and with a high impedance path when the charging voltage is below the power source voltage.

Complexity and power consumption of the integrated circuit can be mitigated by supporting two external high side nFET configurations with only two integrated circuit pins for nFET connection and a single charge pump. Alternatively, multiple external nFET configurations providing pre-charging, charging, pre-discharging, and discharging modes can be implemented with only four integrated circuit pins for nFET connection and a single charge pump. Optionally more than one charge pump can be used.

According to at least one embodiment, protection against faults allowing current flow in relation to ground (e.g., short circuit faults) on the power charging source path can be provided when a parallel high nFET configuration is selected without needing a series diode in the charging path.

In accordance with at least one embodiment, a multiplexed charge pump circuit can be provided for high side FET drive. In battery management system, a control circuit can control a pair of series FETs for the connection and isolation of the battery pack between load and charger. The control of the connection and isolation of the battery pack can provide protection against undesired situations. As an example, the FETs can be nFETs, which may yield cost saving.

As the nFETs can be arranged in series, the charging and discharging current may carried by both FETs. The output of the FETs can be both the charging source and discharging sink (system load). An integrated circuit can include a charge pump source to drive the gates of the high side nFETs above the battery source voltage. Sharing a charge pump with as many nFETs as possible can be beneficial, for example, to reduce cost.

In some applications there is a desire to use parallel charging and discharging MOSFETs with series resistors to provide a crude current-limiting path. These parallel current paths are typically referred to as pre-charge and pre-discharge depending upon the direction of the current flow. It can be beneficial to utilize nFETs for pre-charging and pre-discharging paths, for example, to minimize system costs.

While parallel pre-charge and pre-discharge paths can be provided by external pFET devices with series resistors that provide crude current-limiting capability, and pFET drivers are simpler than nFET drivers because they do not require an integrated charge pump, providing an ability to use external nFET devices can be of benefit. For example, nFET devices may be less expensive than pFET devices. As another example, if nFET devices are used for charging and discharging circuits, an ability to use nFET devices for pre-charging and pre-discharging circuits can simplify parts inventories and provide economy of scale for parts procurement.

In accordance with at least one embodiment, a single charge pump can be implemented in an integrated circuit and powered from the input voltage source (e.g., a power source, such as a battery). Four external nFETs can be used to individually control a charging, pre-charging, discharging and pre-discharging current. Each nFET can be coupled to either the charge pump or a power source through a pair of integrated switches. The charge pump can be connected to an external reservoir capacitor. The reservoir capacitor can increase the rise time of the nFET gate voltages when turned on. The capacitor can reduce the instantaneous voltage drop associated with switching one nFET from off to on. The pre-charge nFET current-limiting resistor can be disposed in series with the drain. The pre-discharge nFET current-limiting resistor can be disposed in series with the source.

There is no limitation on which combinations of nFETs can be turned on simultaneously. As an integrated circuit can provide individual output terminals to control the different nFETs, any combination of the nFETs can be activated and deactivated at any time in any combination. As an example, a single one or the pre-charging, charging, pre-discharging, and discharging nFETs can be activated with the other remaining nFETs deactivated. As another example, any two of the pre-charging, charging, pre-discharging, and discharging nFETs can be activated with the other remaining nFETs deactivated. As a further example, any three of the pre-charging, charging, pre-discharging, and discharging nFETs can be activated with the other remaining nFETs deactivated. As yet another example, all four of the pre-charging, charging, pre-discharging, and discharging nFETs can be activated. All of the nFETs can be deactivated, as may be useful, for example, to place a system in a quiescent state, such as a sleep state or a powered-down state.

It may be desirable to activate, for example, both the pre-charging circuit (PCHG) nFET and the discharging circuit (DSG) nFET during a pre-charging mode of operation. As another example, it may be desirable to activate both the pre-discharge circuit (PDSG) nFET and charging circuit (CHG) nFET during a pre-discharging mode of operation.

As an example, four battery charging or discharging modes of operation can be selected, including pre-discharging, discharging, pre-charging and charging. As an example, a pre-discharging mode of operation can be used to bring the system load equal to the battery voltage in a slow and controlled manner. The different modes of operation can be enabled for different durations. As an example, a pre-discharging mode of operation can be enabled for a short amount of time relative to the other charging or discharging events. As illustrated herein, the times of different charging and discharging events are not necessarily drawn to scale.

In accordance with at least one embodiment, one or more features disclosed herein can be implemented in a system in which charging and discharging a battery or other power source is performed using high side protection nFETs. As another example, one or more features disclosed herein can be implemented in an integrated circuit which can be configured to control such nFETs, which may be external to the integrated circuit.

A system in which a pre-charging or pre-discharging current function, or both, are to be implemented can be constructed as disclosed herein. As an example, a current-limiting element (e.g., a resistor, such as an external resistor) can be selected to set the approximate current magnitude for a pre-charging or pre-discharging current function. Referring to FIG. 11, current-limiting element 1123 can have a value selected to set a pre-charging current, and current-limiting element 1124 can have a value selected to set a pre-discharging current.

In accordance with at least one embodiment, two pairs of nFETs can be connected in a common drain configuration where one from each pair of nFETs is in series with a resistor and one is not. As an example, the two pairs of nFETs can be connected in series with each other and with a power source and a charging source. As another example, the two pairs of nFETs can be connected in parallel with each other, with the parallel combinations connected in series with the power source and a charging source. Within each pair of nFETs, the individual nFETs of the pair can be connected in series with each other. Those series-connected nFET pairs can be connected in series with the power source and a charging source. The charging source can be a power supply. A current-limiting element, such as a resistor, can be included in series in a pre-charging circuit, for example, to limit pre-charging current. The gates of the nFETs are all selectively coupled to a common charge pump through switches that connect each of the gates to the charge pump when their respective switches are turned on.

In accordance with at least one embodiment, utilizing a single charge pump to drive charge, pre-charge, discharge and pre-discharge external MOSFETs can yield substantial benefits, for example, savings in die area, savings in cost, and other benefits. In accordance with at least one embodiment, high side nFETs can be used for all external MOSFETs in the charge, pre-charge, discharge and pre-charge current paths. Use of nFETs for such current paths can, for example, reduce costs, simplify parts inventory, achieve economy of scale in procurement, and the like.

According to Example 1, an integrated circuit comprises a charge pump having a charge pump output terminal; a first semiconductor switch having a first semiconductor switch input terminal and a first semiconductor switch output terminal, wherein the first semiconductor switch output terminal is connected to a first output terminal; a second semiconductor switch having a second semiconductor switch input terminal and a second semiconductor switch output terminal, wherein the second semiconductor switch output terminal is connected to the first output terminal, wherein the second semiconductor switch input terminal is connected to the charge pump output terminal; a third semiconductor switch having a third semiconductor switch input terminal and a third semiconductor switch output terminal, wherein the third semiconductor switch output terminal connected to a second output terminal; a fourth semiconductor switch, having a fourth semiconductor switch input terminal and a fourth semiconductor switch output terminal, wherein the fourth semiconductor switch output terminal is connected to the second output terminal, wherein the fourth semiconductor switch input terminal is connected to the charge pump output terminal; a fifth semiconductor switch having a fifth semiconductor switch input terminal and a fifth semiconductor switch output terminal, wherein the fifth semiconductor switch output terminal is connected to a third output terminal.

According to Example 2, the integrated circuit of Example 1, wherein the first semiconductor switch input terminal and the third semiconductor switch input terminal are connected to a power source terminal.

According to Example 3, the integrated circuit of Example 2, wherein the fifth semiconductor switch input terminal is connected to a power supply terminal.

According to Example 4, the integrated circuit of Example 3 further comprising a sixth semiconductor switch having a sixth semiconductor switch input terminal and a sixth semiconductor switch output terminal, wherein the sixth semiconductor switch output terminal is connected to the third output terminal, wherein the sixth semiconductor switch input terminal is connected to the charge pump output terminal; a seventh semiconductor switch having a seventh semiconductor switch input terminal and a seventh semiconductor switch output terminal, wherein the seventh semiconductor switch output terminal is connected to a fourth output terminal; and an eighth semiconductor switch having an eighth semiconductor switch input terminal and an eighth semiconductor switch output terminal, wherein the eighth semiconductor switch output terminal is connected to the fourth output terminal, wherein the eighth semiconductor switch input terminal is connected to the charge pump output terminal. As an example, the seventh semiconductor switch input terminal is connected to a power supply terminal. As another example, the charge pump has a charge pump input terminal, wherein the charge pump input terminal is connected to the power source terminal.

According to Example 5, the integrated circuit of Example 1, wherein the first semiconductor switch comprises an input transistor having a first input transistor terminal, a second input transistor terminal, and an input transistor control terminal; an output transistor having a first output transistor terminal, a second output transistor terminal, and an output transistor control terminal; and a control transistor having a first control transistor terminal, a second control transistor terminal, and a control transistor control terminal.

According to Example 6, the integrated circuit of Example 5, wherein the first semiconductor switch further comprises a first current-limiting element having a first current-limiting element terminal and a second current-limiting element terminal, wherein the first current-limiting element terminal is connected to the second input transistor terminal and to the first output transistor terminal, and wherein the second current-limiting element terminal is connected to the first control transistor terminal; a first voltage clamp circuit having a first voltage clamp circuit terminal and a second voltage clamp circuit terminal, wherein the first voltage clamp circuit terminal is connected to the first control transistor terminal, and wherein the second voltage clamp circuit terminal is connected to the second input transistor terminal and to the first output transistor terminal; and a second current-limiting element having a third current-limiting element terminal and a fourth current-limiting element terminal, wherein the third current-limiting element terminal is connected to the second control transistor terminal.

Further to Example 6, the second semiconductor switch may further comprise features similar to those recited above with respect to the first semiconductor switch.

According to Example 7, the integrated circuit of Example 6, wherein the first semiconductor switch further comprises a third current-limiting element having a fifth current-limiting element terminal and a sixth current-limiting element terminal, wherein the fifth current-limiting element terminal is connected to the first input transistor terminal, and wherein the second current-limiting element terminal is connected to the output transistor control terminal; and a second voltage clamp circuit having a third voltage clamp circuit terminal and a fourth voltage clamp circuit terminal, wherein the third voltage clamp circuit terminal is connected to the second input transistor terminal and to the first output transistor terminal, and wherein the fourth voltage clamp circuit terminal is connected to the output transistor control terminal.

Further to Example 7, the second semiconductor switch may further comprise features similar to those recited above with respect to the first semiconductor switch.

According to Example 8, an integrated circuit comprises a charge pump connected to a power source terminal and to a ground terminal, the charge pump having a charge pump output terminal; and a switch matrix having a plurality of switch matrix inputs and a plurality of switch matrix outputs, wherein pairs of the plurality of switch matrix outputs are connected to respective ones of a respective plurality of output terminals, and wherein the charge pump output terminal is connected to a first subset comprising at least three of the plurality of switch matrix inputs.

According to Example 9, the integrated circuit of Example 8, wherein the power source terminal is connected to a second subset of at least two of the plurality of switch matrix inputs, wherein the second subset is distinct from the first subset.

According to Example 10, the integrated circuit of Example 9, wherein a power supply terminal is connected to a third subset of at least two of the plurality of switch matrix inputs, wherein the third subset is distinct from the first subset and from the second subset.

According to Example 11, the integrated circuit of Example 10, wherein the first subset comprises at least four of the plurality of switch matrix inputs.

According to Example 12, the integrated circuit of Example 8, wherein the switch matrix comprises a first semiconductor switch, wherein the first semiconductor switch comprises an input transistor having a first input transistor terminal, a second input transistor terminal, and an input transistor control terminal; an output transistor having a first output transistor terminal, a second output transistor terminal, and an output transistor control terminal; and a control transistor having a first control transistor terminal, a second control transistor terminal, and a control transistor control terminal.

According to Example 13, the integrated circuit of Example 12, wherein the first semiconductor switch further comprises a first current-limiting element having a first current-limiting element terminal and a second current-limiting element terminal, wherein the first current-limiting element terminal is connected to the second input transistor terminal and to the first output transistor terminal, and wherein the second current-limiting element terminal is connected to the first control transistor terminal; a first voltage clamp circuit having a first voltage clamp circuit terminal and a second voltage clamp circuit terminal, wherein the first voltage clamp circuit terminal is connected to the first control transistor terminal, and wherein the second voltage clamp circuit terminal is connected to the second input transistor terminal and to the first output transistor terminal; and a second current-limiting element having a third current-limiting element terminal and a fourth current-limiting element terminal, wherein the third current-limiting element terminal is connected to the second control transistor terminal.

According to Example 14, the integrated circuit of Example 13, wherein the first semiconductor switch further comprises a third current-limiting element having a fifth current-limiting element terminal and a sixth current-limiting element terminal, wherein the fifth current-limiting element terminal is connected to the first input transistor terminal, and wherein the second current-limiting element terminal is connected to the output transistor control terminal; and a second voltage clamp circuit having a third voltage clamp circuit terminal and a fourth voltage clamp circuit terminal, wherein the third voltage clamp circuit terminal is connected to the second input transistor terminal and to the first output transistor terminal, and wherein the fourth voltage clamp circuit terminal is connected to the output transistor control terminal.

According to Example 15, a circuit comprising a power source terminal; a ground terminal; a first output terminal; a second output terminal; a third output terminal; a fourth output terminal; a charge pump connected to the power source terminal and to the ground terminal, the charge pump having a charge pump output terminal; a first semiconductor switch having a first semiconductor switch input terminal and a first semiconductor switch output terminal, wherein the first semiconductor switch output terminal is connected to the first output terminal, the first semiconductor switch comprising a first semiconductor switch input transistor and a first semiconductor switch output transistor; a second semiconductor switch having a second semiconductor switch input terminal and a second semiconductor switch output terminal, wherein the second semiconductor switch output terminal is connected to the first output terminal, wherein the second semiconductor switch input terminal is connected to the charge pump output terminal, the second semiconductor switch comprising a second semiconductor switch input transistor and a second semiconductor switch output transistor; a third semiconductor switch having a third semiconductor switch input terminal and a third semiconductor switch output terminal, wherein the third semiconductor switch output terminal connected to the second output terminal, the third semiconductor switch comprising a third semiconductor switch input transistor and a third semiconductor switch output transistor; a fourth semiconductor switch, having a fourth semiconductor switch input terminal and a fourth semiconductor switch output terminal, wherein the fourth semiconductor switch output terminal is connected to the second output terminal, wherein the fourth semiconductor switch input terminal is connected to the charge pump output terminal, the fourth semiconductor switch comprising a fourth semiconductor switch input transistor and a fourth semiconductor switch output transistor; a fifth semiconductor switch having a fifth semiconductor switch input terminal and a fifth semiconductor switch output terminal, wherein the fifth semiconductor switch output terminal is connected to the third output terminal, the fifth semiconductor switch comprising a fifth semiconductor switch input transistor and a fifth semiconductor switch output transistor. a sixth semiconductor switch having a sixth semiconductor switch input terminal and a sixth semiconductor switch output terminal, wherein the sixth semiconductor switch output terminal is connected to the third output terminal, wherein the sixth semiconductor switch input terminal is connected to the charge pump output terminal, the sixth semiconductor switch comprising a sixth semiconductor switch input transistor and a sixth semiconductor switch output transistor; a seventh semiconductor switch having a seventh semiconductor switch input terminal and a seventh semiconductor switch output terminal, wherein the seventh semiconductor switch output terminal is connected to the fourth output terminal, the seventh semiconductor switch comprising a seventh semiconductor switch input transistor and a seventh semiconductor switch output transistor; and an eighth semiconductor switch having an eighth semiconductor switch input terminal and an eighth semiconductor switch output terminal, wherein the eighth semiconductor switch output terminal is connected to the fourth output terminal, wherein the eighth semiconductor switch input terminal is connected to the charge pump output terminal, the eighth semiconductor switch comprising an eighth semiconductor switch input transistor and an eighth semiconductor switch output transistor.

According to Example 16, the circuit of Example 15 further comprising a power supply terminal, wherein the fifth semiconductor switch input terminal and the seventh semiconductor switch input terminal are connected to the power supply terminal, and wherein the first semiconductor switch input terminal and the third semiconductor switch input terminal are connected to the power source terminal.

According to Example 17, the circuit of Example 16, wherein the charge pump has a charge pump input terminal, wherein the charge pump input terminal is connected to the power source terminal.

According to Example 18, the circuit of Example 15, wherein the first semiconductor switch further comprises a control transistor having a first control transistor terminal, a second control transistor terminal, and a control transistor control terminal.

According to Example 19, the circuit of Example 18, wherein the first semiconductor switch input transistor has a first input transistor terminal and a second input transistor terminal, wherein the first input transistor terminal is connected to the first semiconductor switch input terminal, wherein the first semiconductor switch output transistor has a first output transistor terminal and a second output transistor terminal, wherein the second output transistor terminal is connected to the first semiconductor switch output terminal, and wherein the first semiconductor switch further comprises a first current-limiting element having a first current-limiting element terminal and a second current-limiting element terminal, wherein the first current-limiting element terminal is connected to the second input transistor terminal and to the first output transistor terminal, wherein the second current-limiting element terminal is connected to the first control transistor terminal; a first voltage clamp circuit having a first voltage clamp circuit terminal and a second voltage clamp circuit terminal, wherein the first voltage clamp circuit terminal is connected to the first control transistor terminal, and wherein the second voltage clamp circuit terminal is connected to the second input transistor terminal and to the first output transistor terminal; and a second current-limiting element having a third current-limiting element terminal and a fourth current-limiting element terminal, wherein the third current-limiting element terminal is connected to the second control transistor terminal.

According to Example 20, the circuit of Example 19, wherein the first semiconductor switch further comprises a third current-limiting element having a fifth current-limiting element terminal and a sixth current-limiting element terminal, wherein the fifth current-limiting element terminal is connected to the first input transistor terminal, and wherein the second current-limiting element terminal is connected to an output transistor control terminal of the first semiconductor switch output transistor; and a second voltage clamp circuit having a third voltage clamp circuit terminal and a fourth voltage clamp circuit terminal, wherein the third voltage clamp circuit terminal is connected to the second input transistor terminal and to the first output transistor terminal, and wherein the fourth voltage clamp circuit terminal is connected to the output transistor control terminal.

According to Example 21, a semiconductor switch comprises a first field-effect transistor (FET) having a first FET source terminal, a first FET drain terminal, and a first FET gate terminal; a second FET having a second FET source terminal, a second FET drain terminal, and a second FET gate terminal; a third FET having a third FET source terminal, a third FET drain terminal, and a third FET gate terminal, a first current-limiting circuit, a second current-limiting circuit, a first voltage clamp circuit, and a second voltage clamp circuit, wherein the first FET source terminal is connected to the second FET source terminal, to a first terminal of the first current-limiting circuit, to a first terminal of the first voltage clamp circuit, and to a first terminal of the second voltage clamp circuit, wherein the first FET drain terminal is connected to a first terminal of the second current-limiting circuit, wherein a second terminal of the second current-limiting circuit is connected to a second terminal of the second voltage clamp circuit and to the second FET gate terminal, wherein the third FET drain terminal is connected to the first FET gate terminal, to a second terminal of the first current-limiting circuit, and to a second terminal of the first voltage clamp circuit.

According to Example 22, the semiconductor switch of Example 21 further comprising a third current-limiting circuit, wherein the third FET source terminal is connected to a first terminal of the third current-limiting circuit.

According to Example 23, the semiconductor switch of Example 21, wherein the first FET drain terminal is an input terminal of the semiconductor switch, wherein the second FET drain terminal is an output terminal of the semiconductor switch, and wherein the third FET gate terminal is a control terminal of the semiconductor switch.

According to Example 24, the semiconductor switch of Example 21, wherein the first FET, the second FET, and the third FET are p-channel FETs.

According to Example 25, the semiconductor switch of Example 21, wherein the first FET, the second FET, and the third FET are drain-extended p-channel FETs.

According to Example 26, the semiconductor switch of Example 21, wherein the first current-limiting circuit, the second current-limiting circuit, and the third current-limiting circuit are resistors.

According to Example 27, the semiconductor switch of Example 21, wherein the first FET source terminal is further connected to a first FET body terminal of the first FET and to a second FET body terminal of the second FET, wherein a third FET body terminal of the third FET is connected to a ground reference voltage, wherein a second terminal of the third current-limiting circuit is connected to the ground reference voltage, and wherein the third FET gate terminal is configured to receive a switch enable signal to activate the semiconductor switch.

According to Example 28, an integrated circuit comprises a charge pump connected to a power source terminal and to a ground terminal, the charge pump having a charge pump output terminal; and a switch matrix having a plurality of switch matrix inputs and a plurality of switch matrix outputs, wherein a first switch of the switch matrix has a first switch input of the plurality of switch inputs and a first switch output of the plurality of switch outputs, wherein the first switch input is connected to the power source terminal and the first switch output is connected to a first output terminal, wherein the first switch comprises a first switch first field-effect transistor (FET) having a first switch first FET source terminal, a first switch first FET drain terminal, and a first switch first FET gate terminal; a first switch second FET having a first switch second FET source terminal, a first switch second FET drain terminal, and a first switch second FET gate terminal; a first switch third FET having a first switch third FET source terminal, a first switch third FET drain terminal, and a first switch third FET gate terminal, a first switch first current-limiting circuit, a first switch second current-limiting circuit, a first switch first voltage clamp circuit, and a first switch second voltage clamp circuit, wherein the first switch first FET source terminal is connected to the first switch second FET source terminal, to a first terminal of the first switch first current-limiting circuit, to a first terminal of the first switch first voltage clamp circuit, and to a first terminal of the first switch second voltage clamp circuit, wherein the first switch first FET drain terminal is connected to the first switch input and to a first terminal of the first switch second current-limiting circuit, wherein a second terminal of the first switch second current-limiting circuit is connected to a second terminal of the first switch second voltage clamp circuit and to the first switch second FET gate terminal, wherein the first switch second FET drain terminal is connected to the first switch output, wherein the first switch third FET drain terminal is connected to the first switch first FET gate terminal, to a second terminal of the first switch first current-limiting circuit, and to a second terminal of the first switch first voltage clamp circuit.

According to Example 29, the integrated circuit of Example 28, wherein the switch matrix further comprises a second switch having a second switch input of the plurality of switch inputs and a second switch output of the plurality of switch outputs, wherein the second switch input is connected to the charge pump output terminal and the second switch output is connected to the first output terminal.

According to Example 30, the integrated circuit of Example 29, wherein the second switch comprises a second switch first field-effect transistor (FET) having a second switch first FET source terminal, a second switch first FET drain terminal, and a second switch first FET gate terminal; a second switch second FET having a second switch second FET source terminal, a second switch second FET drain terminal, and a second switch second FET gate terminal; a second switch third FET having a second switch third FET source terminal, a second switch third FET drain terminal, and a second switch third FET gate terminal, a second switch first current-limiting circuit, and a second switch first voltage clamp circuit, wherein the second switch first FET drain terminal is connected to the second switch input, wherein the second switch second FET drain terminal is connected to the second switch output, wherein the second switch first FET source terminal is connected to the second switch second FET source terminal, to a first terminal of the second switch first current-limiting circuit, and to a first terminal of the second switch first voltage clamp circuit, wherein the second switch first FET gate terminal is connected to a second terminal of the second switch first current-limiting circuit, to a second terminal of the second switch first voltage clamp circuit, to the second switch second FET gate terminal, and to the second switch third FET drain terminal.

According to Example 31, the integrated circuit of Example 30, wherein the second switch first FET source terminal is further connected to a second switch first FET body terminal of the second switch first FET and to a second switch second FET body terminal of the second switch second FET.

According to Example 32, the integrated circuit of Example 31, wherein the second switch further comprises a second switch second current-limiting circuit, the second switch third FET source terminal connected to a first terminal of the second switch second current-limiting circuit.

According to Example 33, the integrated circuit of Example 32, wherein the second switch third FET has a second switch third FET body terminal, wherein the second switch third FET body terminal is connected to the ground terminal.

According to Example 34, the integrated circuit of Example 33, wherein a second terminal of the second switch second current-limiting circuit is connected to the ground terminal.

According to Example 35, the integrated circuit of Example 34, wherein the second switch third FET gate terminal is configured to receive a second switch enable signal to activate the second switch.

According to Example 36, an integrated circuit comprises a first switch having a first switch input and a first switch output, wherein the first switch input is connected to a power source terminal and the first switch output is connected to a first output terminal, wherein the first switch comprises a first switch first field-effect transistor (FET) having a first switch first FET source terminal, a first switch first FET drain terminal, and a first switch first FET gate terminal; a first switch second FET having a first switch second FET source terminal, a first switch second FET drain terminal, and a first switch second FET gate terminal; a first switch third FET having a first switch third FET source terminal, a first switch third FET drain terminal, and a first switch third FET gate terminal, a first switch first current-limiting circuit, a first switch second current-limiting circuit, a first switch first voltage clamp circuit, and a first switch second voltage clamp circuit, wherein the first switch first FET source terminal is connected to the first switch second FET source terminal, to a first terminal of the first switch first current-limiting circuit, to a first terminal of the first switch first voltage clamp circuit, and to a first terminal of the first switch second voltage clamp circuit, wherein the first switch first FET drain terminal is connected to the first switch input and to a first terminal of the first switch second current-limiting circuit, wherein a second terminal of the first switch second current-limiting circuit is connected to a second terminal of the first switch second voltage clamp circuit and to the first switch second FET gate terminal, wherein the first switch second FET drain terminal is connected to the first switch output, wherein the first switch third FET drain terminal is connected to the first switch first FET gate terminal, to a second terminal of the first switch first current-limiting circuit, and to a second terminal of the first switch first voltage clamp circuit.

According to Example 37, the integrated circuit of Example 36 further comprises a charge pump having a charge pump output terminal; and a second switch having a second switch input and a second switch input, wherein the second switch input is connected to the charge pump output terminal and the second switch output is connected to the first output terminal.

According to Example 38, the integrated circuit of Example 37, wherein the second switch comprises a second switch first field-effect transistor (FET) having a second switch first FET source terminal, a second switch first FET drain terminal, and a second switch first FET gate terminal; a second switch second FET having a second switch second FET source terminal, a second switch second FET drain terminal, and a second switch second FET gate terminal; a second switch third FET having a second switch third FET source terminal, a second switch third FET drain terminal, and a second switch third FET gate terminal, a second switch first current-limiting circuit, and a second switch first voltage clamp circuit, wherein the second switch first FET drain terminal is connected to the second switch input, wherein the second switch second FET drain terminal is connected to the second switch output, wherein the second switch first FET source terminal is connected to the second switch second FET source terminal, to a first terminal of the second switch first current-limiting circuit, and to a first terminal of the second switch first voltage clamp circuit, wherein the second switch first FET gate terminal is connected to a second terminal of the second switch first current-limiting circuit, to a second terminal of the second switch first voltage clamp circuit, to the second switch second FET gate terminal, and to the second switch third FET drain terminal.

According to Example 39, the integrated circuit of Example 38, wherein the second switch further comprises a second switch second current-limiting circuit, the second switch third FET source terminal connected to a first terminal of the second switch second current-limiting circuit.

According to Example 40, the integrated circuit of Example 39 further comprising a third switch having a third switch input and a third switch output; and a fourth switch having a fourth switch input and a fourth switch output, wherein the third switch output is connected to a second output terminal, wherein the fourth switch input is connected to the charge pump output, and wherein the fourth switch output is connected to the second output terminal.

The methods are illustrated and described above as a series of operations or events, but the illustrated ordering of such operations or events is not limiting. For example, some operations or events may occur in different orders and/or concurrently with other operations or events apart from those illustrated and/or described herein. Also, some illustrated operations or events are optional to implement one or more aspects or examples of this description. Further, one or more of the operations or events depicted herein may be performed in one or more separate operations and/or phases. In some examples, the methods described above may be implemented in a computer readable medium using instructions stored in a memory.

According to Example 41, the switch matrix comprises six or more semiconductor switches. As an example, for an output terminal connected to two semiconductor switch outputs from a pair of semiconductor switches, one of the pair of semiconductor switches may have its input connected to a charge pump output. As an example, an apparatus may comprise a first switch pair, a penultimate switch pair, and an ultimate switch pair. The first switch pair may comprise a first semiconductor switch having a first semiconductor switch input terminal and a first semiconductor switch output terminal and a second semiconductor switch having a second semiconductor switch input terminal and a second semiconductor switch output terminal. The penultimate switch pair is the P-$1^{st}$ switch pair of P switch pairs, where P is equal to an integer value of at least three. As each switch pair comprises two switches, the penultimate switch pair comprises a $2*P\text{-}3^{rd}$ semiconductor switch having a $2*P\text{-}3^{rd}$ semiconductor switch input terminal and a $2*P\text{-}3^{rd}$ semiconductor switch output terminal and a $2*P\text{-}2^{nd}$ semiconductor switch having a $2*P\text{-}2^{nd}$ semiconductor switch input terminal and a $2*P\text{-}2^{nd}$ semiconductor switch output terminal. The ultimate switch pair is the $P^{th}$ switch pair of P switch pairs, where P is equal to an integer value of at least three. As each switch pair comprises two switches, the ultimate switch pair comprises a $2*P\text{-}1^{st}$ semiconductor switch having a $2*P\text{-}1^{st}$ semiconductor switch input terminal and a $2*P\text{-}1^{st}$ semiconductor switch output terminal and a $2*P^{th}$ semiconductor switch having a $2*P^{th}$ semiconductor switch input terminal and a $2*P^{th}$ semiconductor switch output terminal. The second semiconductor switch output terminal may be connected to a charge pump output terminal. The $2*P\text{-}2^{nd}$ semiconductor switch output terminal may be connected to the charge pump output terminal. The $2*P^{th}$ semiconductor switch output terminal may be connected to the charge pump output terminal.

In this description, the term "couple" may cover connections, communications or signal paths that enable a functional relationship consistent with this description. Accordingly, if device A generates a signal to control device B to perform an action, then: (a) in a first example, device A is coupled directly to device B; or (b) in a second example, device A is coupled to device B through intervening component C if intervening component C does not substantially alter the functional relationship between device A and device B, so device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device, or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead with little or no change to the remaining circuitry. For example, a field effect transistor, a bipolar junction transistor (BJT—e.g., NPN or PNP), insulated gate bipolar transistors (IGBTs), and/or junction field effect transistor (JFET) may be used in place of or in conjunction with the devices described herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

While certain elements of the described examples are included in an integrated circuit and other elements are external to the integrated circuit, in other examples, additional or fewer features may be incorporated into the integrated circuit. Also, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/–10 percent of that parameter. Modifications are possible in the described examples, and other implementations are possible, within the scope of the claims.

What is claimed is:

1. An integrated circuit comprising:
a circuit having an input and an output, the circuit configurable to receive a first voltage at the input and provide a second voltage higher than the first voltage;
a first switch circuit having inputs coupled to the input and the output of the circuit, a first switch control input, and a first switch output, the first switch circuit configurable to connect one of the input or the output of the circuit to the first switch output responsive to states of the first switch control input; and
a second switch circuit having inputs coupled to the output of the circuit and a power terminal, a second switch control input, and a second switch output, the second switch circuit configurable to connect one of the output of the circuit or the power terminal to the second switch output responsive to states of the second switch control input.

2. The integrated circuit of claim 1, wherein:
the first switch circuit includes a first semiconductor switch and a second semiconductor switch, the first semiconductor switch coupled between the input of the circuit and the first switch output, and the second semiconductor switch coupled between the output of the circuit and the first switch output;
the second switch circuit includes a third semiconductor switch and a fourth semiconductor switch, the third semiconductor switch coupled between the output of the circuit and the second switch output, and the fourth semiconductor switch coupled between the power terminal and the second switch output;
the input of the circuit is coupled to a power source terminal; and
the integrated circuit further comprises a third switch circuit having inputs coupled to the output of the circuit and the power terminal, a third switch control input, and a third switch output, the third switch circuit including a fifth semiconductor switch coupled between the output of the circuit and the third switch output and a sixth semiconductor switch coupled between the power terminal and the third switch output.

3. The integrated circuit of claim 2, wherein the power terminal is coupled to a power supply terminal.

4. The integrated circuit of claim 2, further comprising:
a seventh semiconductor switch coupled between a fourth switch output and the output of the circuit; and
an eighth semiconductor switch coupled between the fourth switch output and the input of the circuit.

5. The integrated circuit of claim 2, wherein the first semiconductor switch comprises:
an input transistor having a first input transistor terminal, a second input transistor terminal, and an input transistor control terminal;
an output transistor having a first output transistor terminal, a second output transistor terminal, and an output transistor control terminal; and
a control transistor having a first control transistor terminal, a second control transistor terminal, and a control transistor control terminal.

6. The integrated circuit of claim 5, wherein the first semiconductor switch further comprises:
a first current-limiting element having a first current-limiting element terminal and a second current-limiting element terminal, wherein the first current-limiting element terminal is coupled to the second input transistor terminal and to the first output transistor terminal, and wherein the second current-limiting element terminal is coupled to the first control transistor terminal;
a first voltage clamp circuit having a first voltage clamp circuit terminal and a second voltage clamp circuit terminal, wherein the first voltage clamp circuit terminal is coupled to the first control transistor terminal, and wherein the second voltage clamp circuit terminal is coupled to the second input transistor terminal and to the first output transistor terminal; and
a second current-limiting element having a third current-limiting element terminal and a fourth current-limiting element terminal, wherein the third current-limiting element terminal is coupled to the second control transistor terminal.

7. The integrated circuit of claim 6, wherein the first semiconductor switch further comprises:
a third current-limiting element having a fifth current-limiting element terminal and a sixth current-limiting element terminal, wherein the fifth current-limiting element terminal is coupled to the first input transistor terminal, and wherein the second current-limiting element terminal is coupled to the output transistor control terminal; and
a second voltage clamp circuit having a third voltage clamp circuit terminal and a fourth voltage clamp circuit terminal, wherein the third voltage clamp circuit terminal is coupled to the second input transistor terminal and to the first output transistor terminal, and wherein the fourth voltage clamp circuit terminal is coupled to the output transistor control terminal.

8. The integrated circuit of claim 1, wherein the circuit is configurable to provide the second voltage by adding an offset to the first voltage.

9. The integrated circuit of claim 8, wherein the circuit is, includes, or is part of a charge pump circuit.

10. The circuit of claim 1, wherein the power terminal is a first power terminal, and the circuit further comprises:
a first transistor and a second transistor coupled between a second power terminal and the first power terminal, the first transistor and second transistors configurable to enable or disable a first current path between the first and second power terminals; and
a third transistor and a fourth transistor coupled between a second power terminal and the first power terminal, the third and fourth transistors configurable to enable or disable a second current path between the first and second power terminals,
wherein each of the first and third transistors has a respective control terminal coupled to the first switch output, and each of the second and fourth transistors has a respective control terminal coupled to the second switch output.

11. The circuit of claim 10, wherein each of the first, second, third, and fourth transistors includes a respective n-channel transistor.

12. A circuit comprising:
a first power terminal;
a second power terminal;
a ground terminal;
a first output terminal;
a second output terminal;
a circuit having an input and an output, the input of the circuit coupled to the first power terminal, the circuit configurable to receive a first voltage at the input and provide a second voltage higher than the first voltage;
a first switch circuit having inputs coupled to the input and the output of the circuit, a first switch control input, and a first switch output coupled to the first output terminal, the first switch circuit configurable to connect one of the input or the output of the circuit to the first switch output responsive to states of the first switch control input; and
a second switch circuit having inputs coupled to the output of the circuit and the second power terminal, a second switch control input, and a second switch output coupled to the second output terminal, the second switch circuit configurable to connect one of the output of the circuit or the second power terminal to the second switch output responsive to states of the second switch control input.

13. The circuit of claim 12, wherein the first power terminal is coupled to a power source terminal, and the second power terminal is coupled to a power supply terminal.

14. The circuit of claim 12, wherein the first switch circuit includes a semiconductor switch, the semiconductor switch including:
an input transistor having a first input transistor terminal, a second input transistor terminal, and an input transistor control terminal;
an output transistor having a first output transistor terminal, a second output transistor terminal, and an output transistor control terminal; and
a control transistor having a first control transistor terminal, a second control transistor terminal, and a control transistor control terminal.

15. The circuit of claim 14, wherein the semiconductor switch includes:
a first current-limiting element having a first current-limiting element terminal and a second current-limiting element terminal, the first current-limiting element terminal is coupled to the second input transistor terminal and to the first output transistor terminal, and the second current-limiting element terminal is coupled to the first control transistor terminal;
a first voltage clamp circuit having a first voltage clamp circuit terminal and a second voltage clamp circuit terminal, the first voltage clamp circuit terminal is coupled to the first control transistor terminal, and the second voltage clamp circuit terminal is coupled to the second input transistor terminal and to the first output transistor terminal; and
a second current-limiting element having a third current-limiting element terminal and a fourth current-limiting element terminal, the third current-limiting element terminal is coupled to the second control transistor terminal.

16. The circuit of claim 15, wherein the semiconductor switch further comprises:
a third current-limiting element having a fifth current-limiting element terminal and a sixth current-limiting element terminal, wherein the fifth current-limiting element terminal is coupled to the first input transistor terminal, and wherein the second current-limiting element terminal is coupled to an output transistor control terminal; and
a second voltage clamp circuit having a third voltage clamp circuit terminal and a fourth voltage clamp circuit terminal, the third voltage clamp circuit terminal is coupled to the second input transistor terminal and to the first output transistor terminal, and the fourth voltage clamp circuit terminal is coupled to the output transistor control terminal.

17. The circuit of claim 12, wherein the circuit is configurable to provide the second voltage by adding an offset to the first voltage.

18. The circuit of claim 17, wherein the circuit is, includes, or is part of a charge pump circuit.

19. The circuit of claim 12, further comprising:
a first transistor and a second transistor coupled between a second power terminal and the first power terminal, the first transistor and second transistors configurable to enable or disable a first current path between the first and second power terminals; and
a third transistor and a fourth transistor coupled between a second power terminal and the first power terminal, the third and fourth transistors configurable to enable or disable a second current path between the first and second power terminals,
wherein each of the first and third transistors has a respective control terminal coupled to the first switch output, and each of the second and fourth transistors has a respective control terminal coupled to the second switch output.

20. The circuit of claim 19, wherein each of the first, second, third, and fourth transistors includes a respective n-channel transistor.

* * * * *